(12) United States Patent
Kim et al.

(10) Patent No.: US 10,374,859 B2
(45) Date of Patent: Aug. 6, 2019

(54) APPARATUS AND METHOD FOR PRE-PROCESSING FOR FILTER BANK MULTI CARRIER SCHEME IN WIRELESS COMMUNICATION SYSTEM

(71) Applicants: Samsung Electronics Co., Ltd, Gyeonggi-do (KR); Industry-Academic Cooperation Foundation, Yonsei University, Seoul (KR)

(72) Inventors: Kyeongyeon Kim, Gyeonggi-do (KR); Dongkyu Sim, Seoul (KR); Taehyun Lee, Seoul (KR); Chungyong Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/344,454

(22) Filed: Nov. 4, 2016

(65) Prior Publication Data
US 2017/0134201 A1    May 11, 2017

(30) Foreign Application Priority Data
Nov. 5, 2015 (KR) .......................... 10-2015-0155338

(51) Int. Cl.
*H04L 25/03* (2006.01)
*H04L 27/26* (2006.01)
(Continued)

(52) U.S. Cl.
CPC ......... *H04L 27/264* (2013.01); *H04B 7/0456* (2013.01); *H04B 17/336* (2015.01);
(Continued)

(58) Field of Classification Search
CPC ........... H04L 27/264; H04L 25/03821; H04B 7/0456
See application file for complete search history.

(56) References Cited

U.S. PATENT DOCUMENTS

2003/0123568 A1* 7/2003 Ophir ................ H04L 25/03828
                                                                 375/296
2013/0329659 A1* 12/2013 Kim ....................... H04W 72/04
                                                                 370/329
(Continued)

FOREIGN PATENT DOCUMENTS

WO    WO 2014/085710 A1    6/2014

OTHER PUBLICATIONS

Francois Horlin, et al., Interference-free SDMA for FBMC-OQAM, EURASIP Journal on Advances in Signal Processing, 2013, 13 pages.

*Primary Examiner* — David B Lugo

(57) ABSTRACT

The present disclosure relates to a 5G or pre-5G communication system for providing a higher data rate after a 4G communication system such as LTE. Particularly, the present disclosure relates to pre-processing for Filter Bank Multi-Carrier (FBMC) in a wireless communication system, and a method of a communication node includes the operations of receiving a signal from a counterpart node, determining a pre-processing scheme according to a channel and a frequency confinement characteristic of a filter based on the received signal, and performing pre-processing for a subcarrier set corresponding to the filter in accordance with the determined pre-processing scheme.

20 Claims, 21 Drawing Sheets

(51) Int. Cl.
*H04B 17/336* (2015.01)
*H04B 17/354* (2015.01)
*H04B 7/0417* (2017.01)
*H04B 7/0456* (2017.01)

(52) U.S. Cl.
CPC ..... *H04B 17/354* (2015.01); *H04L 25/03821* (2013.01); *H04B 7/0417* (2013.01)

(56) References Cited

U.S. PATENT DOCUMENTS

| | | | | |
|---|---|---|---|---|
| 2014/0348254 | A1* | 11/2014 | Lee | H04B 7/0426 375/267 |
| 2015/0236765 | A1* | 8/2015 | Yu | H04B 7/0452 375/267 |
| 2015/0304146 | A1* | 10/2015 | Yang | H04L 5/0066 370/329 |
| 2016/0021556 | A1* | 1/2016 | Sim | H04J 11/0023 455/226.3 |
| 2016/0036614 | A1* | 2/2016 | Van De Beek | H04L 25/03834 375/295 |

* cited by examiner

APPARATUS AND METHOD FOR PRE-PROCESSING FOR FILTER BANK MULTI CARRIER SCHEME IN WIRELESS COMMUNICATION SYSTEM

CROSS-REFERENCE TO RELATED APPLICATION AND CLAIM OF PRIORITY

The present application is related to and claims priority under 35 U.S.C. § 119(a) to a Korean Intellectual Property Office filed on Nov. 5, 2015 and assigned Serial No. 10-2015-0155338, the contents of which are herein incorporated by reference.

TECHNICAL FIELD

The present disclosure relates to pre-processing for a Filter Bank Multi Carrier (FBMC) technique in a wireless communication system.

BACKGROUND

To meet a demand for wireless data traffic that is on an increasing trend after the commercialization of $4^{th}$-Generation (4G) communication systems, an effort to develop improved $5^{th}$-Generation (5G) communication systems or pre-5G communication systems is being made. For this reason, the 5G communication systems or pre-5G communication systems are called beyond 4G network communication systems or post Long Term Evolution (LTE) systems.

To accomplish a high data rate, the 5G communication systems are in consideration of implementation at a band of ultra-high frequency (mmWave) (for example, a band of 60 Giga Hertz (GHz)). To alleviate a path loss of radio waves and increase a propagation distance of the radio waves at the ultra-high frequency, the 5G communication systems are under discussion of beamforming, massive Multiple Input Multiple Output (MIMO), Full Dimensional-MIMO (FD-MIMO), array antenna, analog beamforming, and large scale antenna technologies.

Also, for the sake of system network improvement, the 5G communication systems are under development of technologies of an evolving small cell, an advanced small cell, a cloud Radio Access Network (cloud RAN), an ultra-dense network, Device to Device communication (D2D), wireless backhaul, moving network, cooperative communication, Coordinated Multi-Points (CoMP), received interference cancellation, etc.

In addition to this, the 5G systems are under development of Advanced Coding Modulation (ACM) schemes such as FQAM (Hybrid FSK and QAM modulation) and Sliding Window Superposition Coding (SWSC), and advanced access technologies such as Filter Bank Multi Carrier (FBMC), Non-Orthogonal Multiple Access (NOMA), Sparse Code Multiple Access (SCMA), etc.

FBMC is a technique for generating a transmission symbol having low out-of-band radiation by using a filter bank. FBMC can relatively decrease the number of guard subcarriers for satisfying the same spectrum mask compared to Orthogonal Frequency Division Multiplexing (OFDM). Also, FBMC makes possible signal modulation/demodulation without Cyclic Prefix (CP), increasing frequency efficiency and exhibiting a characteristic robust to a frequency synchronization error.

SUMMARY

To address the above-discussed deficiencies, it is a primary object to provide a method and apparatus for pre-processing for minimizing the influence of an Inter Carrier Interference (ICI) in a Filter Bank Multi Carrier (FBMC) system.

Another exemplary embodiment provides a method and apparatus of applying a different precoding scheme for a subcarrier set that uses a different filter in an FBMC system.

A further exemplary embodiment provides a method and apparatus of applying a wide-band precoder for a subcarrier set that will be provided to a filter bank of a low frequency confinement characteristic in an FBMC system.

A yet another exemplary embodiment provides a method and apparatus of determining a subcarrier region of a wide-band precoder based on an ICI in an FBMC system.

A method for operating in a communication node according to one exemplary embodiment includes the operations of receiving a signal from a counterpart node, determining a pre-processing scheme according to a channel and a frequency confinement characteristic of a filter, based on the received signal, and performing pre-processing for a subcarrier set corresponding to the filter in accordance with the determined pre-processing scheme.

An apparatus of a communication node according to one exemplary embodiment can include a communication module that comprises at least one filter and a pre-processor corresponding to the at least one filter, and a processor. The processor can control to determine a pre-processing scheme according to a channel and a frequency confinement characteristic of a filter based on a signal received from a counterpart node through the communication module, and perform pre-processing for a subcarrier set corresponding to the filter in accordance with the determined pre-processing scheme.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

The operation principle of various exemplary embodiments is described below in detail with reference to the accompanying drawings. In describing various exemplary embodiments below, related well-known functions or constructions are not described in detail since they would obscure the gist of the disclosure in unnecessary detail. And, terms described below, terms defined considering functions in various exemplary embodiments, can be modified in accordance to user and operator's intention or practice. Therefore, the definition should be given on the basis of the content throughout the present specification.

Below, the present disclosure describes a technology for pre-processing for a Filter Bank Multi Carrier (FBMC) technique in a wireless communication system.

For description convenience, exemplified are terms denoting signals or symbols used in the following description, terms denoting signal processing means, terms denoting communication entities, terms denoting control information, terms denoting messages, terms denoting constituent elements of an apparatus, etc. Accordingly, the present disclosure is not limited to the terms described later, and can use other terms having equivalent technological meanings.

For description convenience below, some of terms and names defined in the 3rd-Generation Partnership Project Long Term Evolution (3GPP LTE) standard or the Institute of Electrical and Electronical Engineers (IEEE) 802.11 standard can be used. However, the present disclosure is not limited by the terms and names, and can be identically applied to systems following other standards as well.

Figure 1:
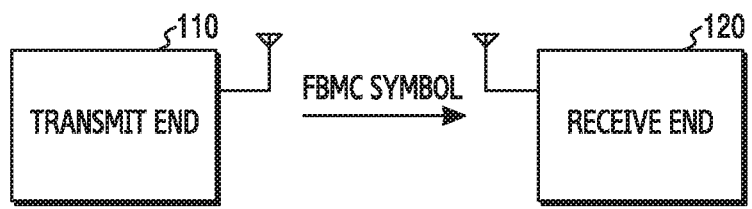
FIG. 1 illustrates a transmit end and a receive end in a wireless communication system according to an exemplary embodiment of the present disclosure.

FIG. 1 illustrates a transmit end and a receive end in a wireless communication system according to an exemplary embodiment of the present disclosure. Referring to FIG. 1, the transmit end 110 transmits an FBMC symbol to the receive end 120. That is, the wireless communication system according to an exemplary embodiment of the present disclosure employs an FBMC technique, and the transmit end 110 generates at least one FBMC symbol, and the receive end 120 interprets the at least one FBMC symbol. In FIG. 1, the distinguishing of the transmit end 110 and the receive end 120 is relative, and represents that the transmit end 110 and the receive end 120 are operated as the subjects of data transmission and reception at a specific time point. Accordingly, the receive end 120 can transmit control information for data reception, etc. Also, the receive end 120 can be operated as a transmit end transmitting data in accordance with a situation. Correspondingly to this, the transmit end 110 can receive the control information for data reception, etc. Also, the transmit end 120 can be operated as a receive end receiving data in accordance with a situation.

Each of the transmit end 110 and the receive end 120 is an electronic device, and can be either a user device or a network device. The user device can be denoted as a terminal, a mobile station, a user equipment, etc., and the network device can be denoted as a base station, a node B, an evolved node B (e-node B), etc. For example, the transmit end 110 and the receive end 120 can be all terminals, or can be a terminal and a base station, respectively.

Figure 2:
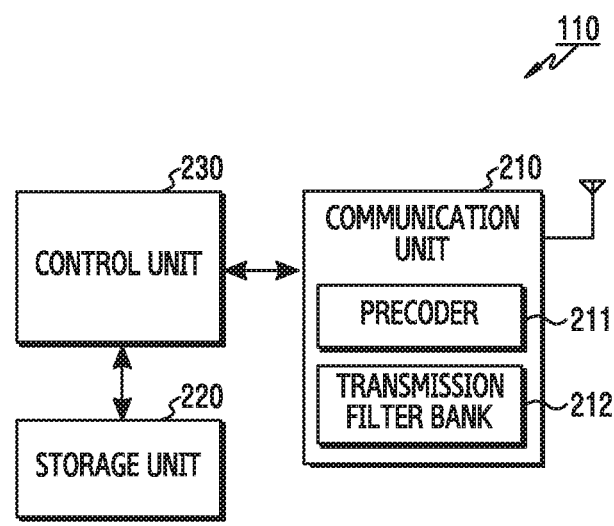
FIG. 2 illustrates a block construction of a transmit end in a wireless communication system according to an exemplary embodiment of the present disclosure.

FIG. 2 illustrates a block construction of a transmit end in a wireless communication system according to an exemplary embodiment of the present disclosure. The terms ' . . . unit', ' . . . er', etc. used below represent the unit of processing at least one function or operation. This can be implemented as hardware or software, or a combination of hardware and software.

Referring to FIG. 2, the transmit end 110 includes a communication unit 210, a storage unit 220, and a control unit 230.

The communication unit 210 performs functions for transceiving a signal through a wireless channel. For example, the communication unit 210 performs a function of conversion between a baseband signal and a bit stream in compliance with the physical layer standard of a system. For example, at data transmission, the communication unit 210 generates complex symbols by encoding and modulating a transmission bit stream. Also, at data reception, the communication unit 210 restores a reception bit stream by demodulating and decoding a baseband signal. Also, the communication unit 210 up converts a baseband signal into a Radio Frequency (RF) band signal and then transmits the RF band signal through an antenna, and down converts an RF band signal received through the antenna into a baseband signal. Particularly, the communication unit 210 includes a precoder 211 and a transmission filter bank 212. In accordance with an exemplary embodiment of the present disclosure, the transmission filter bank 212 can consist of a plurality of filter banks. Also, the precoder 211 can consist of a plurality of precoders performing precoding schemes different from one another. The plurality of precoders can each operate in different precoding schemes in accordance with a frequency confinement characteristic of a corresponding filter bank. 'Frequency confinement characteristic (or, frequency refinement)' refers to how well a filter can pass desired frequency components from a signal input to the filter. In other words, Frequency refinement characteristic refers to how clearly a stop band and a pass band in a frequency response of the filter can be distinguished. For example, if the frequency confinement characteristic is high, a transition interval between the stop band and the pass band can be short; otherwise, the transition interval between the stop band and the pass band can be long. Furthermore, the communication unit 210 can include a transmission filter, a reception filter, an amplifier, a mixer, an oscillator, a Digital to Analog Converter (DAC), an Analog to Digital Converter (ADC), etc.

Also, the communication unit 210 can include a plurality of RF chains. Furthermore, the communication unit 210 can perform beamforming. Furthermore, the communication unit 210 can include a plurality of communication modules to support a plurality of different wireless access technologies. The communication unit 210 transmits and receives a signal as mentioned above. In accordance with this, the communication unit 210 can be denoted as a transmission unit, a reception unit, or a transceiving unit.

The storage unit 220 stores data such as a basic program for an operation of the transmit end 110, an application program, setting information, etc. Particularly, the storage unit 220 can store data for signaling with the receive end 120, in other words, data for interpreting a message from the receive end 120 Also, the storage unit 220 provides the stored data in response to a request of the control unit 230. Also, the storage unit 220 can store information necessary for designing the precoder 211 of the transmit end 110. Here, the design is a meaning including setting or configuration.

The control unit 230 controls the general operations of the transmit end 110. For example, the control unit 230 transceives a signal through the communication unit 210. Also, the control unit 230 records data in the storage unit 220, and read data from the storage unit 220. For this, the control unit 230 can include at least one processor. For example, the control unit 230 can include a Communication Processor (CP) performing control for communication and an Application Processor (AP) controlling an upper layer such as an application program, etc. In accordance with an exemplary embodiment of the present disclosure, the control unit 230 can determine a precoding scheme or a pre-processing scheme corresponding to each of the plurality of filter banks, based on a frequency confinement characteristic of each of the plurality of filter banks. Here, the pre-processing scheme can be a meaning including a precoding scheme, and a receiver scheme (or a post-processing scheme) corresponding to the precoding scheme. Also, the control unit 230 can perform a function for designing a precoder in accordance with the determined precoding scheme. For example, the control unit 230 can control a function for determining a subcarrier region of each precoder based on an Inter Carrier Interference (ICI) on each subcarrier set, and designing a precoder based on the determined subcarrier region. For another example, the control unit 230 can control a function for receiving information representing a precoding scheme for each subcarrier set and information on a subcarrier region of each precoder, and designing a precoder based on the received information. For instance, the control unit 230 can control a function for designing a precoder as the transmit end 110 is described later.

Figure 3:
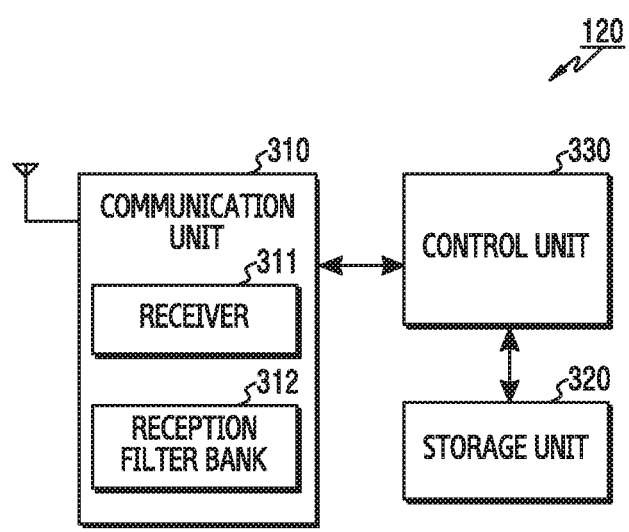
FIG. 3 illustrates a block construction of a receive end in a wireless communication system according to an exemplary embodiment of the present disclosure.

FIG. 3 illustrates a block construction of a receive end in a wireless communication system according to an exemplary embodiment of the present disclosure. The terms ' . . . unit', ' . . . er', etc. used below represent the unit of processing at least one function or operation. This can be implemented as hardware or software, or a combination of hardware and software.

Referring to FIG. 3, the receive end 120 includes a communication unit 310, a storage unit 320, and a control unit 330.

The communication unit 310 performs functions for transceiving a signal through a wireless channel. For example, the communication unit 310 performs a function of conversion between a baseband signal and a bit stream in compliance with the physical layer standard of a system. For example, at data transmission, the communication unit 310 generates complex symbols by encoding and modulating a transmission bit stream. Also, at data reception, the communication unit 310 restores a reception bit stream by demodulating and decoding a baseband signal. Also, the communication unit 310 up converts a baseband signal into an RF band signal and then transmits the RF band signal through an antenna, and down converts an RF band signal received through the antenna into a baseband signal. Particularly, the communication unit 310 includes a receiver 311 for receiving a signal transmitted from the transmit end 110 to perform post processing, and a reception filter bank 312. In accordance with an exemplary embodiment of the present disclosure, the reception filter bank 312 can consist of a plurality of filter banks. Also, the receiver 311 can consist of receivers corresponding to different pre-processing schemes (or precoding schemes). The plurality of receivers can each operate in different schemes in accordance with a frequency confinement characteristic of a corresponding filter bank. Furthermore, the communication unit 310 can include a transmission filter, a reception filter, an amplifier, a mixer, an oscillator, a DAC, an ADC, etc.

Also, the communication unit 310 can include a plurality of RF chains. Furthermore, the communication unit 310 can perform beamforming. Furthermore, the communication unit 310 can include a plurality of communication modules to support a plurality of wireless access technologies different from one another. The communication unit 310 transmits and receives a signal as mentioned above. In accordance with this, the communication unit 310 can be denoted as a transmission unit, a reception unit, or a transceiving unit.

The storage unit 320 stores data such as a basic program for an operation of the receive end 120, an application program, setting information, etc. Particularly, the storage unit 320 can store data for signaling with the transmit end 110, in other words, data for interpreting a message from the transmit end 110. And, the storage unit 320 provides the stored data in response to a request of the control unit 330. Also, the storage unit 320 can store information necessary for designing a receiver corresponding to a precoder of the transmit end 110.

The control unit 330 controls the general operations of the receive end 120. For example, the control unit 330 transceives a signal through the communication unit 310. Also, the control unit 330 records data in the storage unit 320, and reads data from the storage unit 320. For this, the control unit 330 can include at least one processor. For example, the control unit 330 can include a CP performing control for communication and an AP controlling an upper layer such as an application program, etc. In accordance with an exemplary embodiment of the present disclosure, the control unit 330 can determine a pre-processing scheme (or a precoding scheme) corresponding to each of a plurality of filter banks based on a frequency confinement characteristic of each of the plurality of filter banks, and feed back information on the determined pre-processing scheme to the transmit end 110. For example, the control unit 330 can control a function for determining a pre-processing scheme based on an ICI on each subcarrier set, and determining a subcarrier region in accordance with the precoding scheme and then transmitting information on the determined pre-processing scheme and/ or subcarrier region to the transmit end 110. Also, the control unit 330 can control a function for designing a receiver based on information on a pre-processing scheme and/or subcarrier region of the transmit end 110. For instance, the control unit 330 can control a function for designing a receiver as the receive end 120 is described later.

Figure 4:
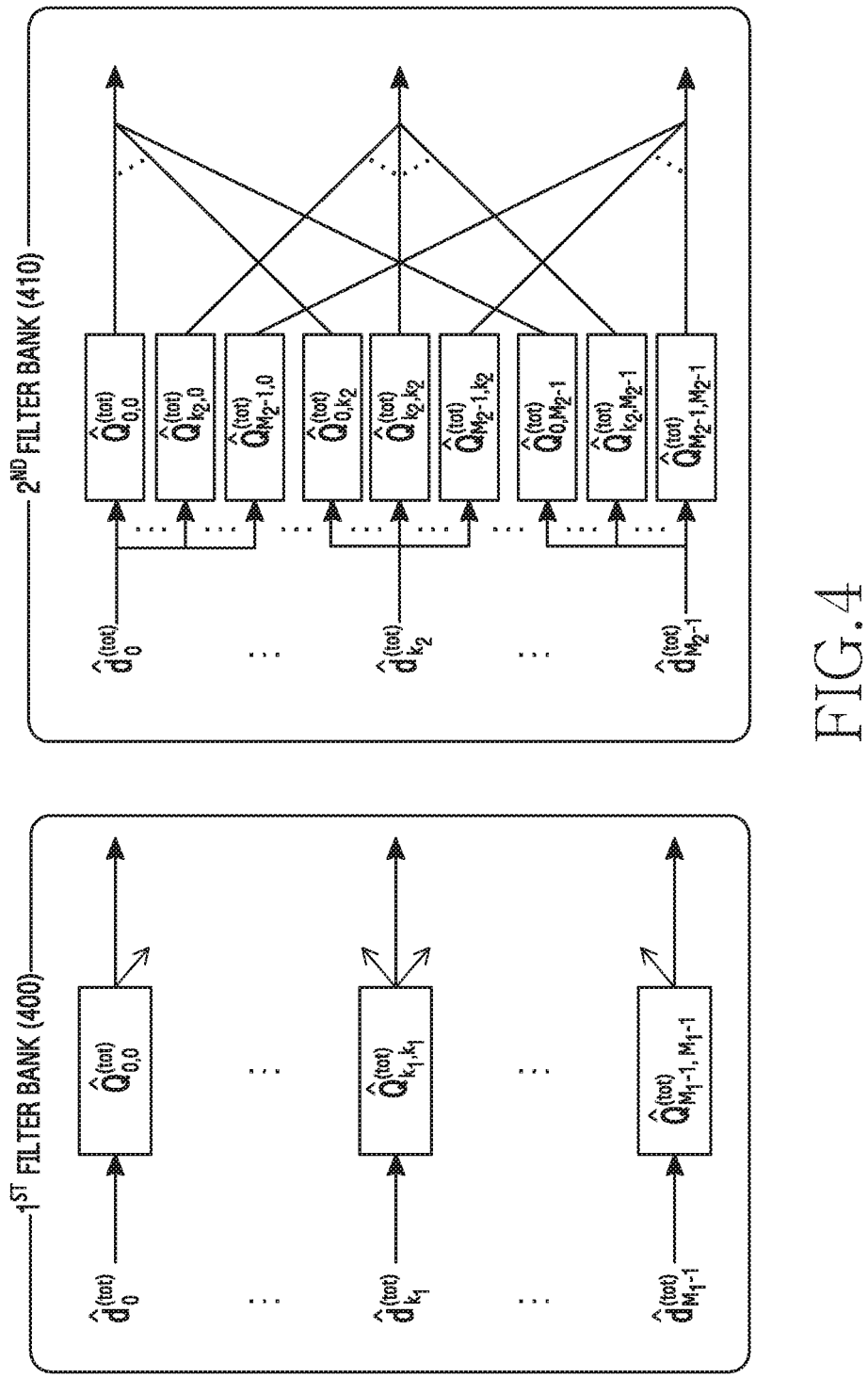
FIG. 4 illustrates a dual filter bank in a wireless communication system according to an exemplary embodiment of the present disclosure.

FIG. 4 illustrates a dual filter bank in a wireless communication system according to an exemplary embodiment of the present disclosure. Here, the dual filter bank is described as an example for description convenience, but the wireless communication system according to the exemplary embodiment of the present disclosure can include a plurality of filter banks that use filters having different features to transmit complex symbols (e.g., Quadrature Amplitude Modulation (QAM) symbols).

Referring to FIG. 4, a transmit end or a receive end can include a first filter bank 400 and a second filter bank 410.

The first filter bank 400 can consist of filters having a high frequency confinement characteristic. The first filter bank 400 can perform filtering for data symbols of each subcarrier, by using an effective channel response matrix including all of a channel and filter of each subcarrier. For example, the first filter bank 400 can perform filtering for data symbols $\hat{d}_{k_1}^{(tot)}$ of a $k_1^{th}$ subcarrier by using an effective channel response matrix $\hat{Q}_{k_1,k_1}^{(tot)}$ including all of a channel and filter between a $k_1^{th}$ input subcarrier and a $k_1^{th}$ output subcarrier. Owing to the filters having the high frequency confinement characteristic, in the first filter bank 400, an ICI does not take place between subcarriers. Accordingly, the first filter bank 400 can perform pre-processing for input subcarriers of the first filter bank 400 by using a sub-band precoder and/or a sub-block precoder in accordance with an exemplary embodiment of the present disclosure. Each of the sub-band precoder and the sub-block precoder is of a symbol level precoding scheme of performing precoding using a current channel and a transmultiplexer response between filters. Particularly, the sub-band precoder performs precoding between time and space domain symbols that exist in the same subcarrier. The sub-band precoder can perform precoding with a low complexity since a matrix size of the sub-band precoder is determined depending on the number of sub blocks and the number of antennas. Also, the sub-block precoder performs precoding between frequency and space domain symbols that exist in the same sub block. Since the sub-block precoder performs precoding for all subcarrier symbols, the sub-block precoder has the merit of being robust to interference occurring from an adjacent subcarrier.

Also, the second filter bank 410 can consist of filters of a low frequency confinement characteristic. The second filter bank 410 can perform filtering for data symbols of each subcarrier, by using effective channel response matrixes including channels and filters between a corresponding input subcarrier and all output subcarriers. For example, the second filter bank 410 can perform filtering for data symbols $\hat{d}_{k_2}^{(tot)}$ of a $k_2^{th}$ subcarrier, by applying effective channel response matrixes $\hat{Q}_{0,k_2}^{(tot)}, \ldots, \hat{Q}_{k_2,k_2}^{(tot)}, \ldots, \hat{Q}_{M_2-1,k_2}^{(tot)}$ including channels and filters between all input subcarriers and a $k_2^{th}$ output subcarrier, to the data symbols $\hat{d}_{k_2}^{(tot)}$ of the $k_2^{th}$ subcarrier. Owing to the filters having the low frequency confinement characteristic, in the second filter bank 410, a great ICI takes place between subcarriers. Accordingly, in an exemplary embodiment of the present disclosure, the second filter bank 410 uses a wide-band precoder to perform pre-processing for input subcarriers of the second filter bank 410, thereby preventing performance deterioration caused by the ICI. The wide-band precoder according to the exemplary embodiment of the present disclosure is of a scheme of performing precoding for an adjacent subcarrier symbol as well as a desired subcarrier.

As described above, a dual filter bank or multi filter bank multi carrier system according to an exemplary embodiment of the present disclosure can perform independent precoding schemes in accordance with characteristics of respective filters, for subcarrier sets that will be provided to the filters of different characteristics. For example, the dual filter bank or multi filter bank multi carrier system can perform sub-band precoding for a subcarrier set that will be provided to the first filter bank, and can perform wide-band precoding for a subcarrier set that will be provided to the second filter bank.

Figure 5:
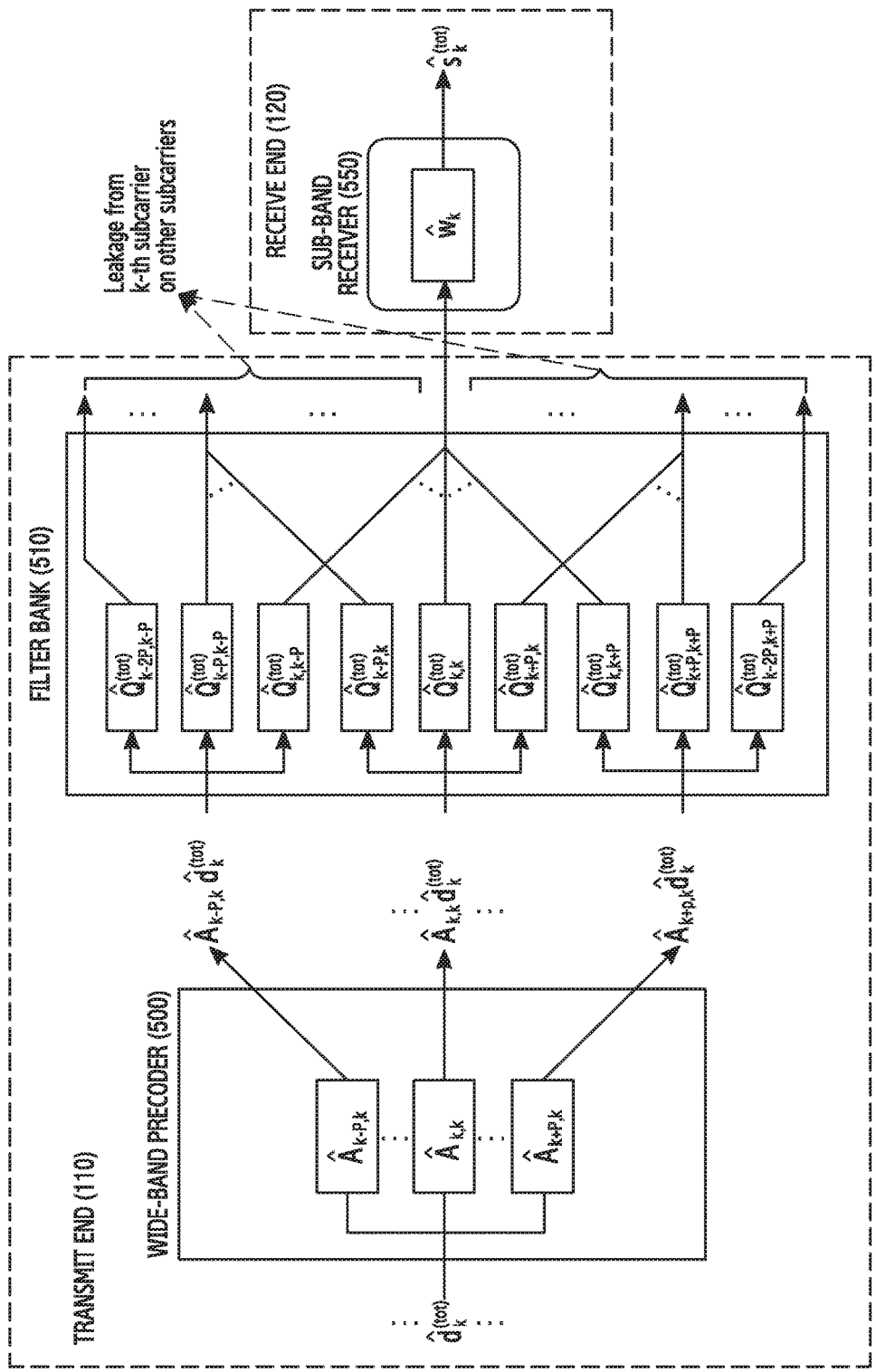
FIG. 5 illustrates a structure of a wide-band precoder and a sub-band receiver in a wireless communication system according to an exemplary embodiment of the present disclosure.

FIG. 5 illustrates a structure of a wide-band precoder and a sub-band receiver in a wireless communication system according to an exemplary embodiment of the present disclosure.

Referring to FIG. 5, the transmit end 110 can include a wide-band precoder 500 and a filter bank 510. For instance, the transmit end 110 can use the wide-band precoder 500 to perform pre-processing for a subcarrier set corresponding to the filter bank 510, in consideration of that the filter bank 510 includes filters of a low frequency confinement characteristic.

The wide-band precoder 500 can be constructed to perform precoding between time and space domain symbols for adjacent subcarriers as well as a desired subcarrier set. For instance, assuming that the desired subcarrier set corresponding to the filter bank 510 is a $k^{th}$ subcarrier, the wide-band precoder 500 can include a precoding matrix $\hat{A}_{k-P,k}, \ldots$, for a $k^{th}$ input subcarrier and a $(k-P)^{th}$ output subcarrier, a precoding matrix $\hat{A}_{k,k}, \ldots$, for a $k^{th}$ input subcarrier and a $k^{th}$ output subcarrier, and/or a precoding matrix $\hat{A}_{k+P,k}$ for a $k^{th}$ input subcarrier and a $(k+P)^{th}$ output subcarrier. Here, the 'P' represents a subcarrier region. Here, the subcarrier region 'P' can be determined in the transmit end 110 or the receive end 120. A scheme of determining the subcarrier region 'P' is described below in detail. Also, the wide-band precoder 500 is designed to satisfy a criterion of maximizing a Signal to Leakage and Noise Ratio (SLNR), as in Equation 1 below, to minimize an inter carrier interference occurring from a desired subcarrier on other subcarriers.

$$\hat{A}_k^{(P)} = \begin{bmatrix} \hat{A}_{k-P,k} \\ \vdots \\ \hat{A}_{k+P,k} \end{bmatrix} = \underset{A_k^{(P)}}{\operatorname{argmax}} [SLNR_k]$$

Equation 1 where $$SLNR_k = \frac{Tr\left((\hat{A}_k^{(P)})^H (\hat{Q}_k^{(P)})^H \hat{Q}_k^{(P)} \hat{A}_k^{(P)}\right)}{Tr\left((A_k^{(P)})^H \left(N_T \sigma_n^2 I_{(2P+1)N_T N} + (\hat{Q}_k^{(-P)})^H \hat{Q}_k^{(-P)}\right) A_k^{(P)}\right)}$$

Here, the 'k' is a subcarrier index, the 'P' is a subcarrier region, the $\hat{A}_{k-P,k}$ represents a precoding matrix for a $k^{th}$ input subcarrier and a $(k-P)^{th}$ output subcarrier, and the $\hat{A}_{k+P,k}$ represents a precoding matrix for a $k^{th}$ input subcarrier and a $(k+P)^{th}$ output subcarrier. Also, the $\hat{A}_k^{(P)}$ can represent a wide-band precoding matrix in which a desired subcarrier is 'k' and a subcarrier region is 'P'. Also, the $\hat{Q}_k^{(P)}$ represents a transmultiplexer response matrix in which a subcarrier is 'k' and a subcarrier region is 'P'.

In the wide-band precoder 500, data symbols outputted after applying of each precoding matrix are provided to the filter bank 510. Like the second filter bank, the filter bank 510 can consist of filters of a low frequency confinement characteristic. The filter bank 510 can perform filtering for data symbols of each subcarrier, by applying an effective channel response matrix including channels and filters between a corresponding input subcarrier and all output subcarriers, to the data symbols of the each subcarrier.

As above, the receive end 120 can include a sub-band receiver 550 corresponding to the wide-band precoder 500 of the transmit end 110 according as the transmit end 110 uses the wide-band precoder 500. For example, the receive end 120 can include a sub-band receiver of a matching filter form as in Equation 2 below for the sake of the diagonalization of an effective channel response including a precoder, for a received signal inputted as a desired subcarrier.

$$\hat{W}_k = (\hat{A}_k^{(P)})^H (\hat{Q}_k^P)^H$$

Equation 2

Here, the $\hat{A}_k^{(P)}$ represents a wide-band precoding matrix in which a desired subcarrier is 'k' and a subcarrier region is 'P', and the $\hat{Q}_k^P$ represents a transmultiplexer response matrix in which a subcarrier is 'k', and a subcarrier region is 'P'. Also, the $\hat{W}_k$ represents a matrix of a sub-band receiver.

As described above, in case where the filter bank 510 of the transmit end 110 uses filters of a low frequency confinement characteristic, the filter bank 510 can use a wide-band precoder including an adjacent subcarrier, thereby minimizing the influence of an ICI and preventing performance deterioration. Undoubtedly, a sub-block precoding scheme can alleviate the influence of the ICI in that the sub-block precoding scheme performs precoding for all subcarrier symbols existing in the same sub-block, but has a disadvantage in which a size of a precoder matrix is increased according to the number of subcarriers. Also, the sub-block precoding scheme has a problem in which a noise power is relatively increased in a receive end, because a size of the Frobenius norm is increased in a response matrix inversion process, at the time of designing a sub-block precoder based on Minimum Mean Square Error (MMSE).

Figure 6:
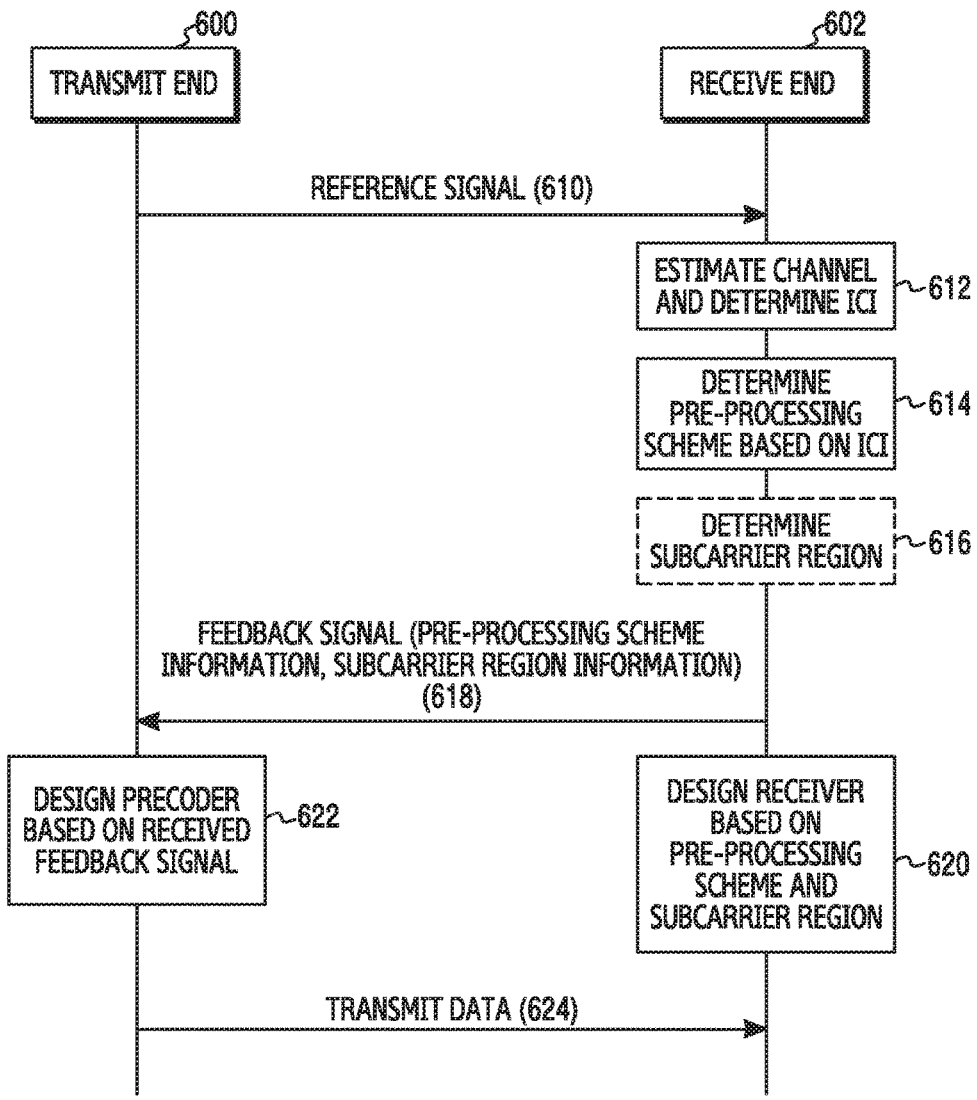
FIG. 6 illustrates a signaling and operation procedure of a transmit end and a receive end for downlink in a wireless communication system according to an exemplary embodiment of the present disclosure.

FIG. 6 illustrates a signaling and operation procedure of a transmit end and a receive end for downlink in a wireless communication system according to an exemplary embodiment of the present disclosure. Here, the transmit end 600 represents a base station, and the receive end 602 represents a user terminal.

Referring to FIG. 6, the transmit end 600 transmits a reference signal to the receive end 602. For instance, in step 610, the transmit end 600 can transmit a Cell specified Reference Signal (CRS) or a Channel State Information-Reference Signal (CSI-RS) to the receive end 602.

In step 612, the receive end 602 estimates a channel based on the reference signal received from the transmit end 600, and acquires an ICI on at least one subcarrier set based on the channel estimation result. For example, the receive end 602 acquires a transmultiplexer response matrix based on the reference signal received from the transmit end 600, and determines the ICI from the acquired transmultiplexer response matrix.

In step 614, based on the ICI on the at least one subcarrier set, the receive end 602 determines a pre-processing scheme (or precoding scheme) for the corresponding subcarrier set. Here, the pre-processing scheme can include a sub-band pre-processing scheme, a wide-band pre-processing scheme, a sub-block pre-processing scheme, etc. In an exemplary embodiment of the present disclosure, a description is made assuming that, based on the ICI, the receive end 602 determines the sub-band precoding scheme or determines the wide-band precoding scheme. But, the receive end 602 can also determine another precoding scheme based on the ICI in accordance with a design scheme. For example, the receive end 602 can compare a maximum value of an ICI sum with a threshold value, and determine whether the transmit end 600 will use the sub-band precoding scheme or whether the transmit end 600 will use the wide-band precoding scheme. Here, if the maximum value $$\max_k \left[ \sum_{l \neq k} Q_{k,l} \right]$$

of the ICI sum is less than or is equal to the threshold value $\gamma_P$, it can be determined that the receive end 602 uses the sub-band precoding scheme and, in case where the maximum value $$\max_k \left[ \sum_{l \neq k} Q_{k,l} \right]$$

of the ICI sum is greater than the threshold value $\gamma_P$, it can be determined that the transmit end 600 uses the wide-band precoding scheme. Here, the threshold value $\gamma_P$ can be set as in Equation 3 below such that the maximum value $$\max_k \left[ \sum_{l \neq k} Q_{k,l} \right]$$

of the ICI sum can guarantee an average value of a minimum Signal to Interference Ratio (SIR) for all subcarriers.

$$E\left[\min_k(SIR_k)\right] = \frac{E[|Q_{k,k}|^2]}{\gamma_P} \Rightarrow \gamma_P = \frac{E[|Q_{k,k}|^2]}{E\left[\min_k(SIR_k)\right]} \quad \text{Equation 3}$$

$$\text{where } Q_{k,l} = \|\hat{Q}_{k,l}^{(tot)}\|_F, \; SIR_k = \frac{|Q_{k,k}|^2}{\sum_{l \neq k} |Q_{k,l}|^2}$$

Here, the 'k' and the 'l' represent subcarrier indexes, and the $\gamma_P$ represents a threshold value. Also, the $Q_{k,l}$ represents an ICI between a $k^{th}$ subcarrier and an $l^{th}$ subcarrier. Also, the $Q_{k,l}$ can be acquired by determining the Frobenius norm of the $\hat{Q}_{k,l}^{(tot)}$.

If it is determined that the transmit end 600 uses the wide-band precoding scheme, in step 616, the receive end 602 can determine a subcarrier region for a wide-band precoder of the transmit end 600. In contrast, if it is determined that the transmit end 600 uses the sub-band precoding scheme, the receive end 602 omits an operation of step 616. The transmit end 600 can determine the subcarrier region based on a result value of dividing a maximum value of an ICI sum by a maximum value of a corresponding ICI response. For example, the receive end 602 determines the result value of dividing the maximum value of the ICI sum by the maximum value of the corresponding ICI response, as a subcarrier region determination metric $\tilde{P}$, as in Equation 4 below.

$$\tilde{P} = \frac{\sum_{l \neq k} Q_{k,l}}{\max_l [Q_{k,l}]} \quad \text{Equation 4}$$

Figure 9:
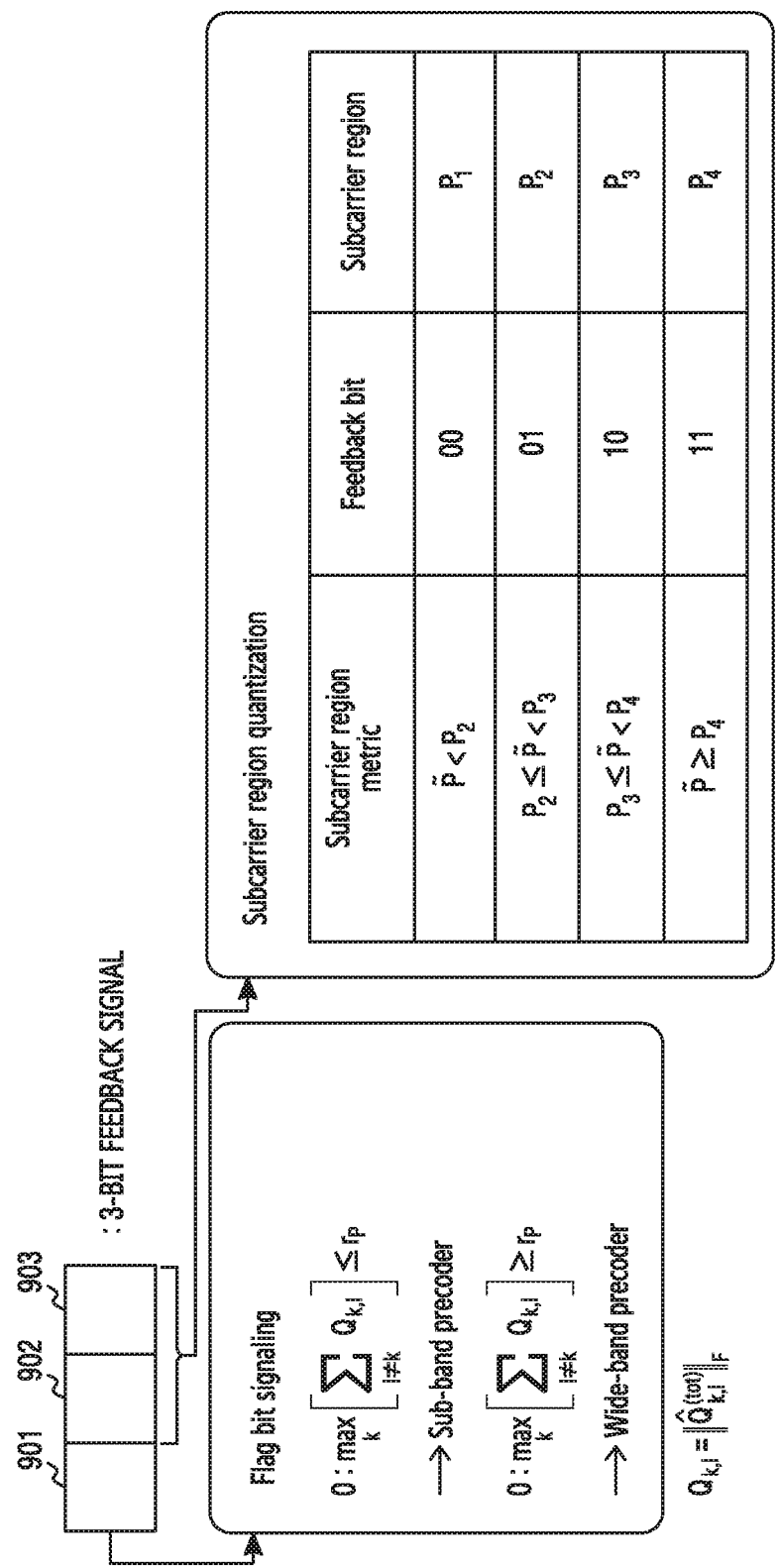
FIG. 9 illustrates a structure of a feedback signal representing a subcarrier region of a wide-band precoder in a wireless communication system according to an exemplary embodiment of the present disclosure.
Figure 10A:
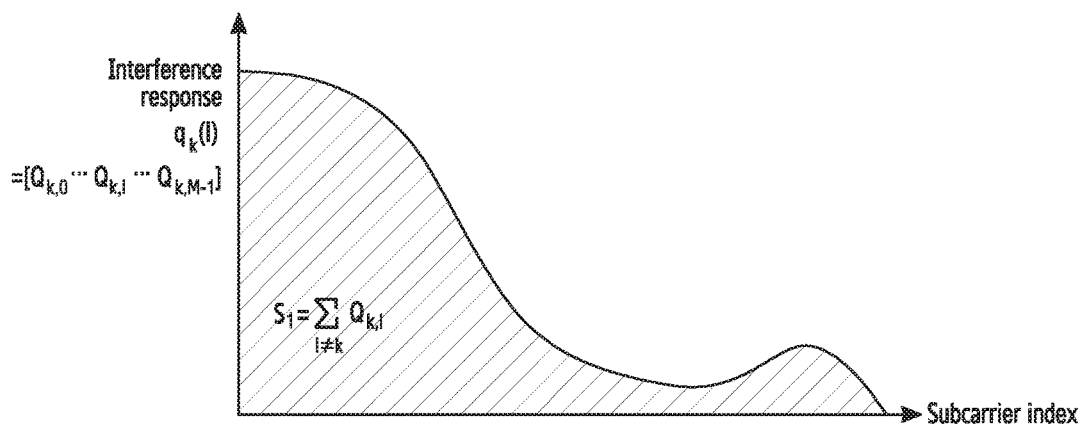
FIG. 10A and FIG. 10B illustrate a scheme of determining a subcarrier region based on an ICI response in a wireless communication system according to an exemplary embodiment of the present disclosure.
Figure 10B:
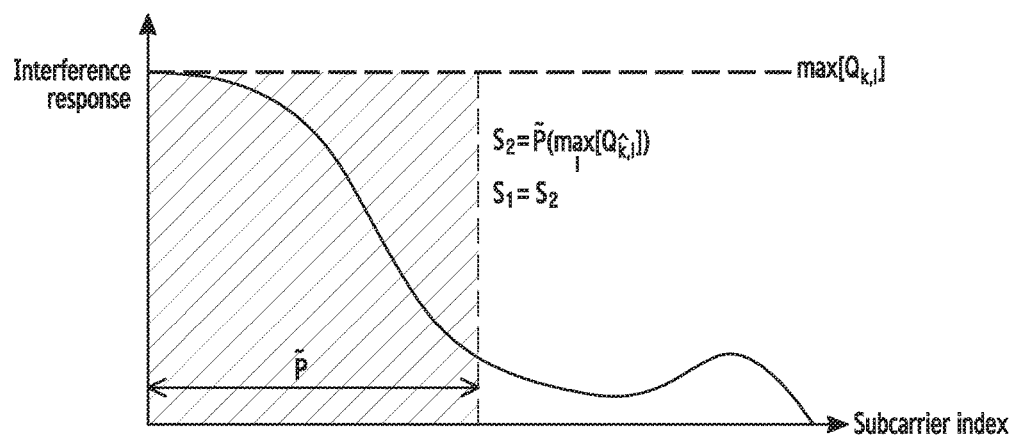

To determine the subcarrier region, the receive end 602 can measure an ICI occurrence range of a transmultiplexer response by using an ICI response in a subcarrier in which a size of an ICI sum is a maximum value. As illustrated in FIG. 10A and FIG. 10B, the receive end 602 can set the subcarrier region determination metric $\tilde{P}$ to represent a region consistent with a sum $$\sum_{l \neq k} Q_{k,l}$$

of the whole value of the whole ICI, on a basis of a maximum value $$\max_l [Q_{k,l}]$$

of an ICI response. If the subcarrier region determination metric $\tilde{P}$ is set, the receive end 602 can determine a subcarrier region 'P' for a wide-band precoder of the transmit end 600 based on a subcarrier region quantization table as illustrated in FIG. 9. For example, in case where the subcarrier region determination metric $\tilde{P}$ is less than 'P$_2$', the receive end 602 can determine that the subcarrier region is 'P$_1$' and, in case where the subcarrier region determination metric $\tilde{P}$ is greater than or is equal to the 'P$_2$' and is less than 'P$_3$', the receive end 602 can determine that the subcarrier region is the 'P$_2$'. Also, in case where the subcarrier region determination metric $\tilde{P}$ is greater than or is equal to the 'P$_3$' and is less than 'P$_4$', the receive end 602 can determine that the subcarrier region is the 'P$_3$' and, in case where the subcarrier region determination metric $\tilde{P}$ is greater than or is equal to the 'P$_4$', the receive end 602 can determine that the subcarrier region is the 'P$_4$'. Here, the 'P$_1$' is a value less than the 'P$_2$'.

In step 618, the receive end 602 transmits a feedback signal to the transmit end 600. Here, the feedback signal can include at least one of the precoding scheme information determined in step 614 and the subcarrier region information determined in step 616. For example, in case where it is determined that the transmit end 600 uses the sub-band precoding scheme, the feedback signal includes the precoding scheme information, but may not include the subcarrier region information. For another example, in case where it is determined that the transmit end 600 uses the wide-band precoding scheme, the feedback signal can include the precoding scheme information and the subcarrier region information. In accordance with an exemplary embodiment of the present disclosure, the feedback signal can consist of three bits as illustrated in FIG. 9. In detail, the feedback signal can consist of a flag bit 901 of one bit representing a precoding scheme, and feedback bits 902 and 903 of two bits representing information representing a subcarrier region. For example, in case where the precoding scheme of the transmit end 600 is the wide-band precoding, and the subcarrier region for the wide-band precoder is determined as 'P$_2$', the receive end 602 can transmit '101' as the feedback signal. For another example, in case where the precoding scheme of the transmit end 600 is the wide-band precoding, and the subcarrier region for the wide-band precoder is determined as 'P$_4$', the receive end 602 can transmit '111' as the feedback signal. In the above description, a description has been made in which the receive end 602 includes the subcarrier region information in the feedback signal only when the precoding scheme is the wide-band precoding, but the receive end 602 can include the subcarrier region information in the feedback signal even when the precoding scheme is the sub-band precoding in accordance with a design scheme. In addition, the receive end 602 can transmit precoder criterion information necessary for precoder design. For example, the precoder criterion information can include information necessary for designing a precoder based on Maximum Ratio combining at Transmitter (MRT), information necessary for designing a precoder of minimizing interference power (leakage), etc. For example, in a channel in which an ICI does not almost occur, an MRT based precoding scheme of maximizing a reception SNR of a corresponding subcarrier can get a higher performance gain than a precoding scheme which considers interference power (leakage) occurring on other subcarriers. Accordingly, the receive end 602 can transmit information representing whether to design a precoder in compliance with any criterion based on a channel state.

In step 620, the receive end 602 designs a receiver based on the determined precoding scheme and subcarrier region. For example, the receive end 602 can design a sub-band receiver of a matching filter form as shown in Equation 2.

Also, in step 622, the transmit end 600 can design a precoder for a subcarrier set corresponding to the receive end 602, based on the feedback signal received from the receive end 602. For example, the transmit end 600 can check information on the precoding scheme and the subcarrier region based on the feedback signal, and design the precoder based on the checked information. In case where the precoding scheme is the sub-band precoding, the transmit end 600 can design a sub-band precoder performing precoding between time and space domain symbols for a desired subcarrier 'k'. In contrast, in case where the precoding scheme is the wide-band precoding, the transmit end 600 can design a wide-band precoder performing precoding between time and space domain symbols for a desired subcarrier 'k' and an adjacent subcarrier region 'p'. At this time, the transmit end 600 designs the wide-band precoder such that the wide-band precoder satisfies a criterion of maximizing an SLNR as shown in Equation 1.

In step 624, the transmit end 600 can transmit data based on the designed precoder, and the receive end 602 can receive data based on the designed receiver.

Figure 7:
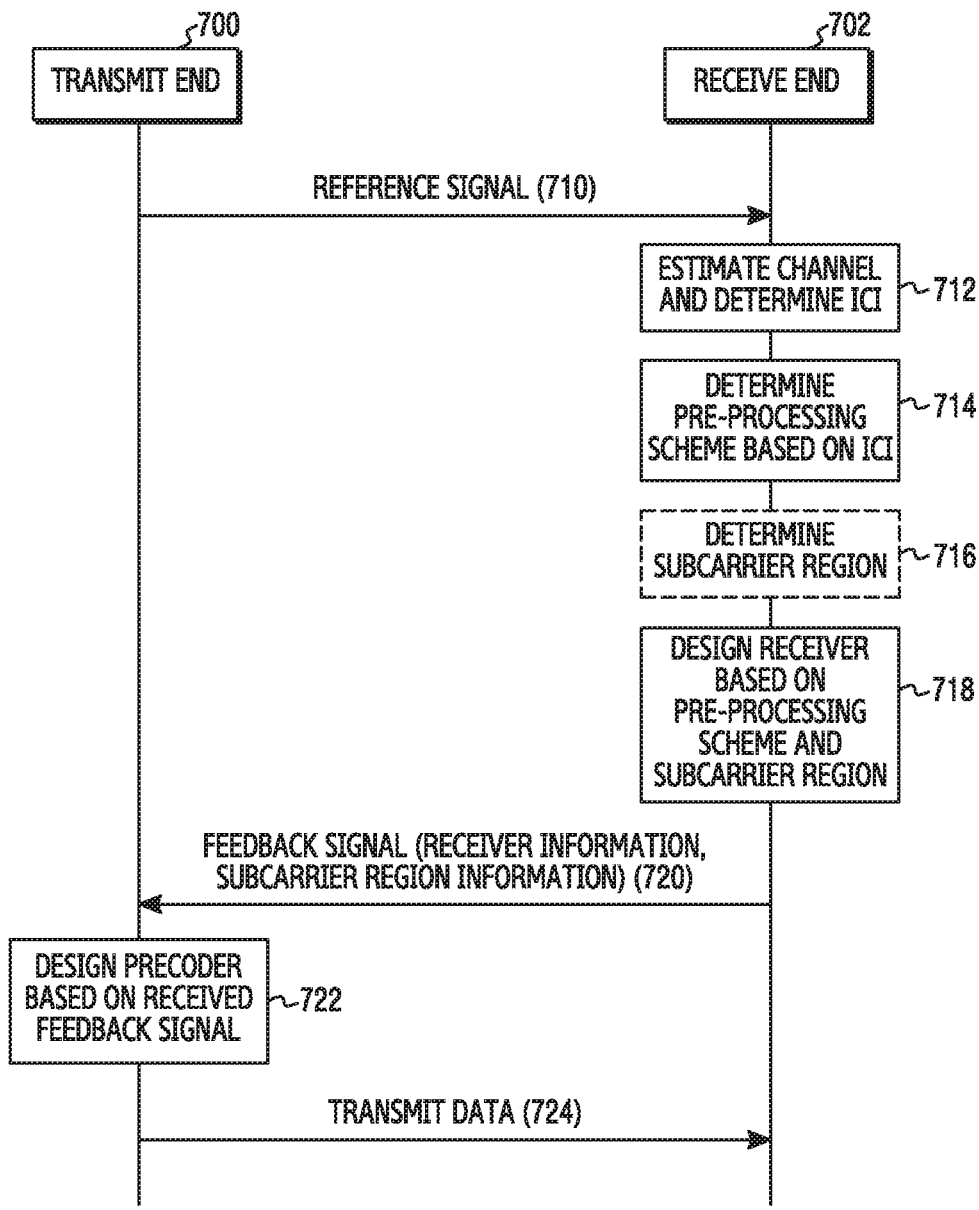
FIG. 7 illustrates a signaling and operation procedure of a transmit end and a receive end for uplink in a wireless communication system according to an exemplary embodiment of the present disclosure.

FIG. 7 illustrates a signaling and operation procedure of a transmit end and a receive end for uplink in a wireless communication system according to an exemplary embodiment of the present disclosure. Here, the transmit end 700 represents a terminal, and the receive end 702 represents a base station.

Referring to FIG. 7, the transmit end 700 transmits a reference signal to the receive end 702. For instance, in step 710, the transmit end 700 can transmit a Sounding Reference Signal (SRS) to the receive end 702.

In step 712, the receive end 702 estimates a channel for at least one subcarrier set corresponding to the transmit end 700, based on the reference signal received from the transmit end 700, and acquires an ICI on the corresponding subcarrier set based on the channel estimation result. For example, the receive end 702 acquires a transmultiplexer response matrix based on the reference signal received from the transmit end 700, and determines the ICI from the acquired transmultiplexer response matrix.

In step 714, the receive end 702 determines a pre-processing scheme based on the ICI. Here, the pre-processing scheme can include a sub-band pre-processing scheme, a wide-band pre-processing scheme, a sub-block pre-processing scheme, etc. In an exemplary embodiment of the present disclosure, a description is made assuming that, based on the ICI on the at least one subcarrier set corresponding to the transmit end 700, the receive end 702 determines the sub-band pre-processing scheme or the wide-band pre-processing scheme for the corresponding subcarrier set. But, the receive end 702 can also determine another precoding scheme based on the ICI in accordance with a design scheme. For example, the receive end 702 can compare a maximum value of an ICI sum with a threshold value, and determine whether the receive end will use a sub-band receiver or will use a wide-band receiver. Here, in case where a maximum value $$\max_k \left[ \sum_{l \neq k} Q_{k,l} \right]$$

of an ICI sum is less than or is equal to a threshold value $\gamma_P$, the receive end 702 can determine to use the sub-band receiver and, in case where the maximum value $$\max_k \left[ \sum_{l \neq k} Q_{k,l} \right]$$

of the ICI sum is greater than the threshold value $\gamma_P$, the receive end 702 can determine to use the wide-band receiver. Here, the threshold value $\gamma_P$ can be set as in Equation 3 mentioned above such that the maximum value $$\max_k \left[ \sum_{l \neq k} Q_{k,l} \right]$$

of the ICI sum can guarantee an average value of a minimum SIR for all subcarriers.

If it is determined to use the wide-band pre-processing scheme, in step 716, the receive end 702 can determine a subcarrier region of the wide-band receiver. In contrast, if it is determined to use the sub-band pre-processing scheme, the receive end 702 omits an operation of step 716. The transmit end 700 can determine a subcarrier region of a wide-band receiver for a corresponding subcarrier set, based on a result value of dividing a maximum value of an ICI sum by a maximum value of a corresponding ICI response. For example, the receive end 702 determines the result value of dividing the maximum value of the ICI sum by the maximum value of the corresponding ICI response, as a subcarrier region determination metric $\tilde{P}$, as in Equation 4 mentioned above. To determine the subcarrier region, the receive end 702 can measure an ICI occurrence range of a transmultiplexer response by using an ICI response in a subcarrier in which a size of an ICI sum is a maximum value. The receive end 702 can set the subcarrier region determination metric $\tilde{P}$ to represent a region consistent with a sum $$\sum_{l \neq k} Q_{k,l}$$

of the whole value of the whole ICI, on a basis of a maximum value $$\max_l \lfloor Q_{k,l} \rfloor$$

of an ICI response as illustrated in FIG. 10A and FIG. 10B. If the subcarrier region determination metric $\tilde{P}$ is set, the receive end 702 can determine a subcarrier region 'P' for a wide-band receiver based on a subcarrier region quantization table as illustrated in FIG. 9. For example, in case where the subcarrier region determination metric $\tilde{P}$ is less than 'P$_2$', the receive end 702 can determine that the subcarrier region is 'P$_1$' and, in case where the subcarrier region determination metric $\tilde{P}$ is greater than or is equal to the 'P$_2$' and is less than 'P$_3$', the receive end 602 can determine that the subcarrier region is the 'P$_2$'. Also, in case where the subcarrier region determination metric $\tilde{P}$ is greater than or is equal to 'P$_3$' and is less than 'P$_4$', the receive end 702 can determine that the subcarrier region is the 'P$_3$' and, in case where the subcarrier region determination metric $\tilde{P}$ is greater than or is equal to the 'P$_4$', the receive end 702 can determine that the subcarrier region is 'P$_4$'. Here, the 'P$_1$' is a value less than the 'P$_2$'.

In step 718, the receive end 702 designs a receiver based on the determined pre-processing scheme and subcarrier region. In step 720, the receive end 702 transmits a feedback signal to the transmit end 700. Here, the feedback signal can include at least one of the precoding scheme information determined in step 714 and subcarrier region information determined in step 716. Additionally, the feedback signal can include information on the designed receiver. For example, in case where the pre-processing scheme of the receive end 702 is the sub-band pre-processing scheme, the feedback signal includes information representing the sub-band pre-processing scheme, but may not include the subcarrier region information. For another example, in case where the pre-processing scheme of the receive end 702 is the wide-band pre-processing scheme, the feedback signal can include information representing the wide-band pre-processing scheme and the subcarrier region information. In accordance with an exemplary embodiment of the present disclosure, the feedback signal can consist of three bits like illustrated in FIG. 9. In detail, the feedback signal can consist of a flag bit of one bit representing a pre-processing scheme (or a receiver scheme), and feedback bits of two bits representing information representing a subcarrier region. For example, in case where the receive end 702 uses the wide-band receiver, and the subcarrier region for the wide-band receiver is determined as 'P2', the receive end 702 can transmit '101' as the feedback signal. For another example, in case where the receive end 702 uses the wide-band receiver, and the subcarrier region for the wide-band receiver is determined as 'P4', the receive end 702 can transmit '111' as the feedback signal. In the above description, a description has been made in which the receive end 702 includes the subcarrier region information in the feedback signal only when the receive end 702 uses the wide-band receiver, but can include the subcarrier region information in the feedback signal even when the receive end 702 uses the sub-band receiver in accordance with a design scheme. In addition, the receive end 702 can transmit precoder criterion information necessary for precoder design of the transmit end 200. For example, the precoder criterion information can include information necessary for designing a precoder based on an MRT, information necessary for designing a precoder minimizing interference power (leakage), etc. For example, in a channel in which an ICI does not almost occur, an MRT based precoding scheme of maximizing a reception SNR of a corresponding subcarrier can get a higher performance gain than a precoding scheme which considers interference power (leakage) occurring on other subcarriers. Accordingly, the receive end 702 can transmit information representing whether to design a precoder in accordance with any criterion based on a channel state.

In step 722, the transmit end 700 designs a precoder based on the determined precoding scheme and subcarrier region. For example, the transmit end 700 can design a sub-band precoder for the sake of the diagonalization of an effective channel response corresponding to the determined pre-processing scheme and subcarrier region. The transmit end 700 can transmit data based on the designed sub-band precoder, and the receive end 702 can receive data based on the designed receiver.

In the aforementioned exemplary embodiment of the present disclosure, an example has been given in which a transmit end or a receive end receives a reference signal transmitted from a counterpart node and estimates a channel, but the transmit end or the receive end can use a synchronization signal, a preamble, a pilot, etc. in accordance with a design scheme as well.

Figure 8:
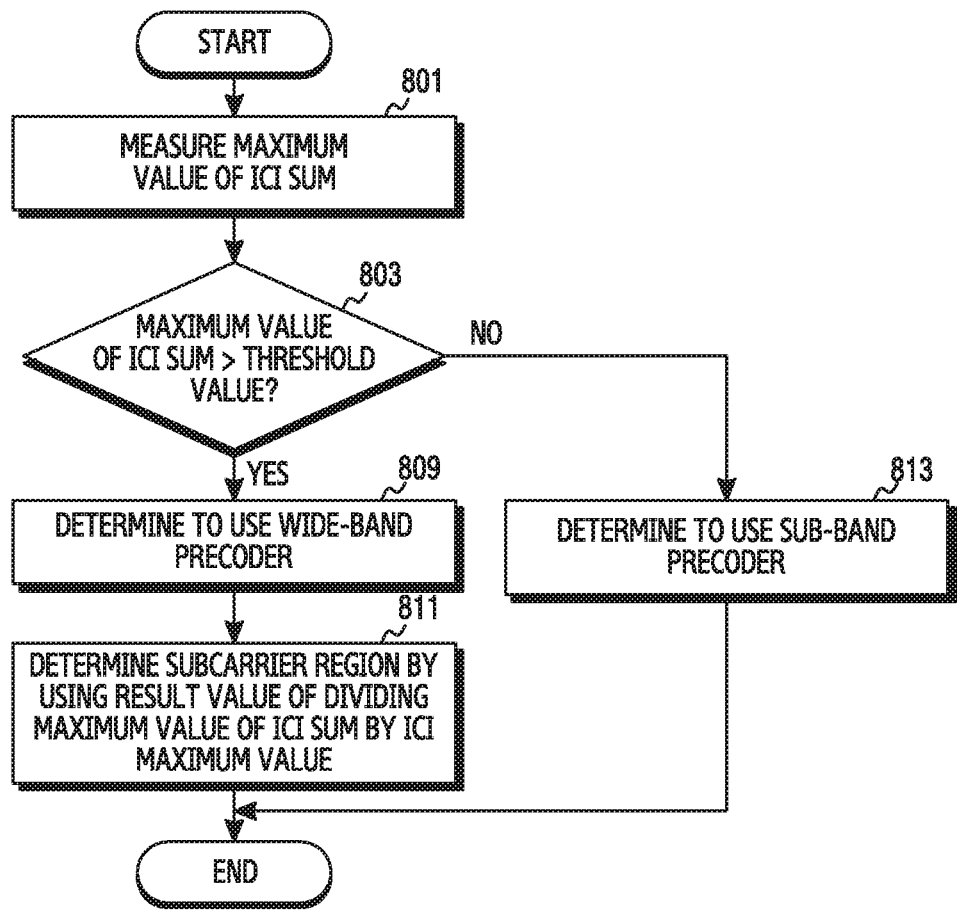
FIG. 8 illustrates an operation procedure of determining a precoding scheme and a subcarrier region of a wide-band precoder in a wireless communication system according to an exemplary embodiment of the present disclosure.

FIG. 8 illustrates an operation procedure of determining a precoding scheme and a subcarrier region of a wide-band precoder in a wireless communication system according to an exemplary embodiment of the present disclosure. An operation of FIG. 8 can be performed in a transmit end, or can be performed in a receive end. For description convenience below, a description is for example made for a case in which the operation of FIG. 8 is performed in the receive end.

Referring to FIG. 8, in step 801, the receive end measures a maximum value of an ICI sum. For example, the receive end can acquire an ICI on at least one subcarrier set based on a previously acquired channel estimation result, and measure a maximum value of the acquired ICI sum. Here, the receive end can acquire a transmultiplexer response matrix based on a reference signal received from the transmit end, and determine the ICI from the acquired transmultiplexer response matrix. Also, the ICI $Q_{k,l}$ can be acquired by determining the Frobenius norm of $Q_{k,l}^{tot}$.

Thereafter, in step 803, the receive end checks if the maximum value of the ICI sum is greater than a threshold value. Here, the threshold value can be set as in Equation 3 mentioned above such that the maximum value of the ICI sum can guarantee an average value of a minimum SIR for all subcarriers.

In case where the maximum value of the ICI sum is less than or is equal to the threshold value, in step 813, the receive end determines that the transmit end uses a sub-band precoder. In contrast, in case where the maximum value of the ICI sum is greater than the threshold value, in step 809, the receive end determines that the transmit end uses a wide-band precoder. For example, as illustrated in FIG. 9, if a maximum value $$\max_k \left[ \sum_{l \neq k} Q_{k,l} \right]$$

of an ICI sum is less than or is equal to a threshold value $\gamma_P$, the receive end can determine that the transmit end uses the sub-band precoder for a corresponding subcarrier set and, if the maximum value $$\max_k \left[ \sum_{l \neq k} Q_{k,l} \right]$$

of the ICI sum is greater than the threshold value $\gamma_P$, the receive end can determine that the transmit end uses the wide-band precoder for a corresponding subcarrier set.

In step 811, the receive end determines a subcarrier region by using a result value of dividing the maximum value of the ICI sum by an ICI maximum value. For instance, the receive end determines the result value of dividing the maximum value of the ICI sum by a maximum value of a corresponding ICI response, as a subcarrier region determination metric $\tilde{P}$, as shown in Equation 4 and then, determines a subcarrier region 'P' for the wide-band precoder that the transmit end will use, based on a subcarrier region quantization table as illustrated in FIG. 9. For example, in case where the subcarrier region determination metric $\tilde{P}$ is less than '$P_2$', the receive end can determine that the subcarrier region is '$P_1$' and, in case where the subcarrier region determination metric $\tilde{P}$ is greater than or is equal to the '$P_2$' and is less than '$P_3$', the receive end can determine that the subcarrier region is the '$P_2$'. Also, in case where the subcarrier region determination metric $\tilde{P}$ is greater than or is equal to the '$P_3$' and is less than '$P_4$', the receive end can determine that the subcarrier region is the '$P_3$' and, in case where the subcarrier region determination metric $\tilde{P}$ is greater than or is equal to the '$P_4$', the receive end can determine that the subcarrier region is the '$P_4$'.

Thereafter, the receive end terminates the operation procedure of determining the pre-coding scheme and the subcarrier region of the wide-band precoder according to an exemplary embodiment of the present disclosure.

In the above description, the receive end can determine a pre-processing scheme and/or a subcarrier region according to the pre-processing scheme so as to design a precoder or a receiver, and feed back information determined to design the precoder or the receiver, to the transmit end. At this time, the receive end can feed back channel information based on a coherence time. For example, the receive end can determine the subcarrier region by measuring an average ICI of a transmultiplexer response, based on long term information of a channel, for a channel in which a coherence time is greater than a threshold time. At this time, the receive end once feeds back information on the subcarrier region within the coherence time. Accordingly, the transmit end and the receive end can use a wide-band pre-processor designed to include a subcarrier region of the same size within the coherence time, i.e., a wide-band precoder and/or a wide-band receiver. But, there is a disadvantage of resulting in performance deterioration caused by an ICI if the subcarrier region is determined smaller than a range of an ICI occurring in accordance with a real channel state, and increasing a complexity of a precoder or receiver compared to a performance gain if the subcarrier region is determined greater than the range of the ICI occurring in accordance with the channel state. For another example, the receive end can determine a subcarrier region by measuring an average ICI of a transmultiplexer response, based on information of an instantaneous channel, for a channel in which a coherence time is less than a threshold time. At this time, the receive end can feed back information on the subcarrier region every channel. Accordingly, the number of feedback bits can increase, but there is an advantage of making efficient pre-processing possible by reflecting a state of a current channel.

Based on the above-mentioned exemplary embodiments, FIG. 11 to FIG. 14 below describe various exemplary embodiments in a situation in which channel state information is imperfect (imperfect Channel State Information at Transmitter (imperfect CSIT). Particularly, FIG. 11 to FIG. 14 below describe a way of managing a wide-band pre-processing technique in the situation in which the channel state information is imperfect.

Figure 11:
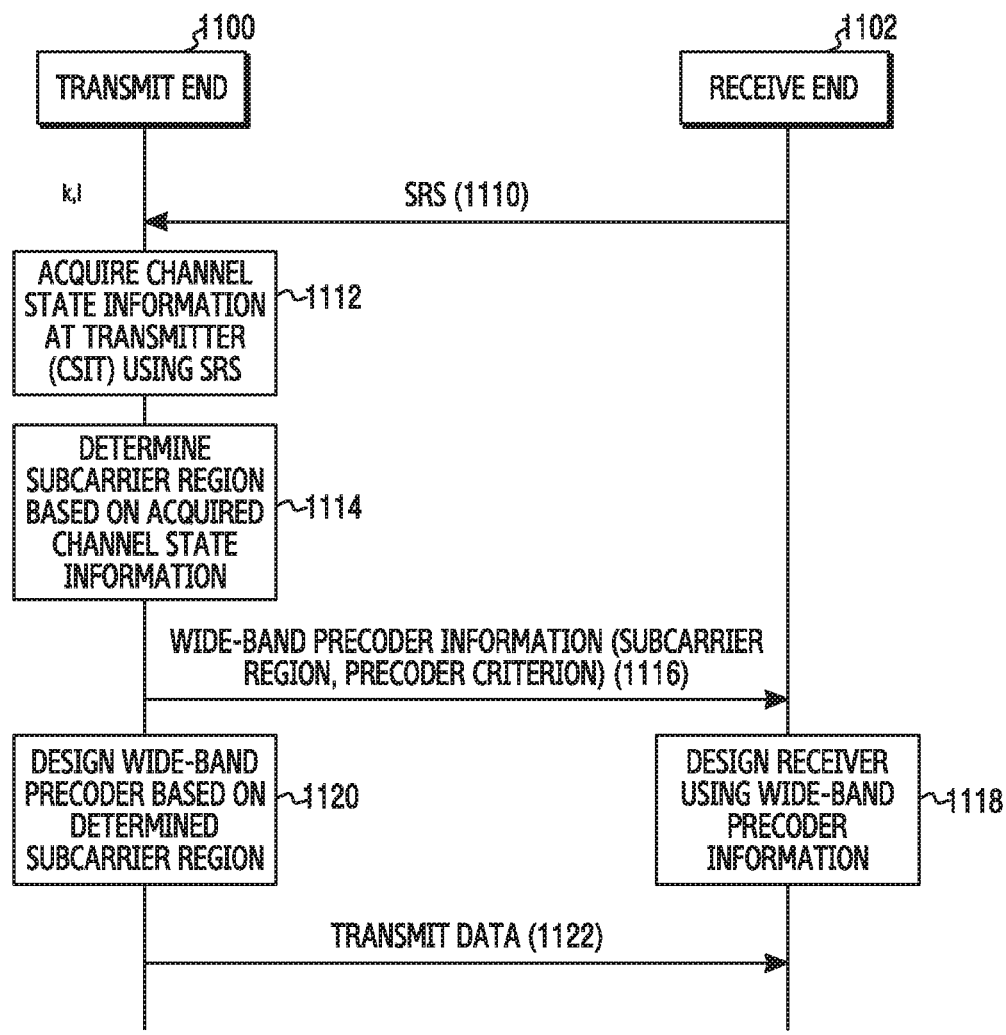
FIG. 11 illustrates one example of a signaling and operation procedure of a transmit end and a receive end in case where channel state information is imperfect in a wireless communication system according to an exemplary embodiment of the present disclosure.

FIG. 11 illustrates one example of a signaling and operation procedure of a transmit end and a receive end in case where channel state information is imperfect in a wireless communication system according to an exemplary embodiment of the present disclosure. Here, a signaling and operation procedure of a transmit end and a receive end for downlink in a Time Division Duplex (TDD) environment is described. For instance, it is assumed that a transmit end 1100 is a base station, and a receive end 1102 is a terminal.

Referring to FIG. 11, in step 1110, the transmit end 1100 receives a Sounding Reference Signal (SRS) from the receive end 1102. In step 1112, the transmit end 1100 acquires channel state information at the transmit end, based on the SRS received from the receive end 1102.

In step 1114, the transmit end 1100 determines a subcarrier region based on the acquired channel state information. For example, the transmit end 1100 can determine a subcarrier region using uplink channel information, based on a reciprocity characteristic of a channel. For example, as described in FIG. 6 to FIG. 8 above, the transmit end 1100 can determine an ICI from the channel state information, and compare a maximum value of an ICI sum and a threshold value, and then determine a wide-band pre-processing technique in accordance with the comparison result. The transmit end 1100 can determine a subcarrier region for a corresponding subcarrier set based on a result value of dividing the maximum value of the ICI sum by a maximum value of a corresponding ICI response. For example, the transmit end 1100 can determine the result value of dividing the maximum value of the ICI sum by the maximum value of the corresponding ICI response, as a subcarrier region determination metric, as in Equation 4 above and then, determine a subcarrier region 'P' based on a subcarrier region quantization table as illustrated in FIG. 9.

Thereafter, in step 1116, the transmit end 1100 transmits wide-band precoder information to the receive end 1102. The wide-band precoder information can include subcarrier region information and precoder criterion information. Here, the subcarrier region information can include or represent information (e.g., a flag bit) representing if the transmit end 1100 uses a sub-band precoder or uses a wide-band precoder for a corresponding subcarrier set. Also, the precoder criterion information can include information necessary for designing an MRT based precoder, information necessary for designing a precoder minimizing interference power (leakage), etc.

In step 1118, the receive end 1102 designs a receiver corresponding to the wide-band precoder, based on the wide-band precoder information received from the transmit end 1100. For example, the receive end 1102 can design a sub-band receiver of a matching filter form as in Equation 2 above, for the sake of the diagonalization of an effective channel response including a precoder, for a received signal inputted as a desired subcarrier.

In step 1120, the transmit end 1100 designs the wide-band precoder based on the determined subcarrier region. Here, the wide-band precoder can be designed to satisfy a criterion of maximizing an SLNR as in Equation 1 above, based on the subcarrier region.

In step 1122, the transmit end 1100 can use the wide-band precoder to transmit data to the receive end 1102, and the receive end 1102 can use the sub-band receiver to receive the data from the transmit end 1100.

Figure 12:
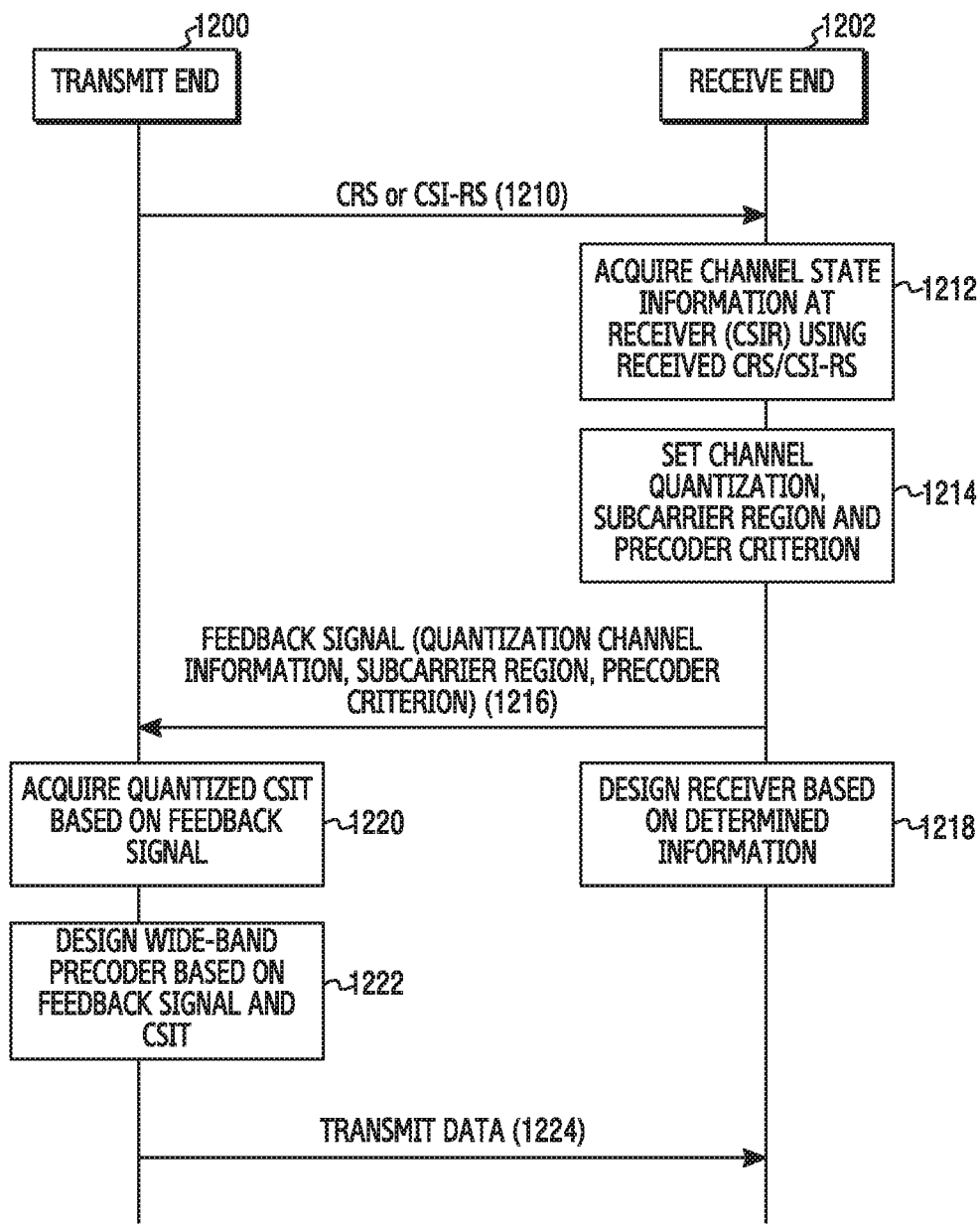
FIG. 12 illustrates another example of a signaling and operation procedure of a transmit end and a receive end in case where channel state information is imperfect in a wireless communication system according to an exemplary embodiment of the present disclosure.

FIG. 12 illustrates another example of a signaling and operation procedure of a transmit end and a receive end in case where channel state information is imperfect in a wireless communication system according to an exemplary embodiment of the present disclosure. Here, a signaling and operation procedure of a transmit end and a receive end for downlink in a Frequency Division Duplex (FDD) environment is described. For instance, it is assumed that a transmit end 1200 is a base station, and a receive end 1202 is a terminal.

Referring to FIG. 12, in step 1210, the transmit 1200 transmits a CRS or a CSI-RS to the receive end 1202. In step 1212, the receive end 1202 acquires Channel State Information at Receiver (CSIR), based on the CRS or CSI-RS received from the transmit end 1200. For example, the receive end 1202 can acquire the Channel State Information at Receiver (CSIR) from the received CRS or CSI-RS.

In step 1214, the receive end 1202 determines a channel quantization, a subcarrier region, and a precoder criterion, based on the acquired channel state information. For example, as described in FIG. 6 to FIG. 8 above, the receive end 1202 can determine an ICI from channel state information, and compare a maximum value of an ICI sum and a threshold value, and then determine a wide-band pre-processing technique in accordance with the comparison result. The receive end 1202 can determine a subcarrier region for a corresponding subcarrier set, based on a result value of dividing the maximum value of the ICI sum by a maximum value of a corresponding ICI response. For example, the receive end 1202 can determine the result value of dividing the maximum value of the ICI sum by the maximum value of the corresponding ICI response, as a subcarrier region determination metric $\tilde{P}$, as in Equation 4 above and then, determine a subcarrier region 'P' based on a subcarrier region quantization table as illustrated in FIG. 9.

Thereafter, in step 1216, the receive end 1202 transmits a feedback signal to the transmit end 1200. The feedback signal can include quantized channel information, subcarrier region information, and precoder criterion information. Here, the subcarrier region information can include or represent information (e.g., a flag bit) representing if the transmit end 1200 uses a sub-band precoder or uses a wide-band precoder for a corresponding subcarrier set. Also, the precoder criterion information can include information necessary for designing an MRT based precoder, information necessary for designing a precoder minimizing interference power (leakage), etc.

In step 1218, the receive end 1202 designs a receiver corresponding to the wide-band precoder, based on the information determined in step 1214. For example, the receive end 1202 can design a sub-band receiver of a matching filter form as in Equation 2 above, for the sake of the diagonalization of an effective channel response including a precoder, for a received signal inputted as a desired subcarrier.

In step 1220, the transmit end 1200 can acquire a quantized CSIT, based on the feedback signal. In step 1222, the transmit end 1200 can design a wide-band precoder based on the feedback signal and the CSIT. At this time, the wide-band precoder can be designed to satisfy a criterion of maximizing an SLNR as in Equation 1 above, based on the subcarrier region included in the feedback signal.

In step 1224, the transmit end 1200 can use the wide-band precoder to transmit data to the receive end 1202, and the receive end 1202 can use the sub-band receiver to receive the data from the transmit end 1200.

Figure 13:
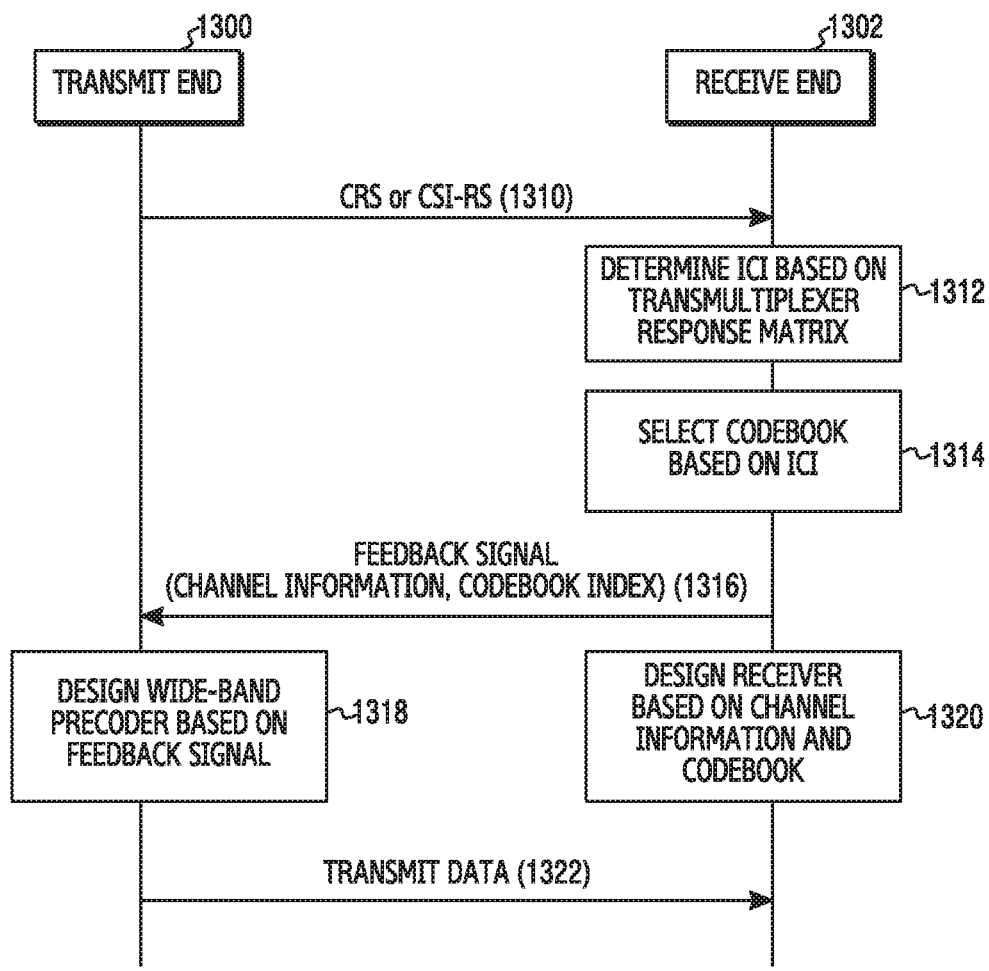
FIG. 13 illustrates a further example of a signaling and operation procedure of a transmit end and a receive end in case where channel state information is imperfect in a wireless communication system according to an exemplary embodiment of the present disclosure.

FIG. 13 illustrates a further example of a signaling and operation procedure of a transmit end and a receive end in case where channel state information is imperfect in a wireless communication system according to an exemplary embodiment of the present disclosure. Here, a signaling and operation procedure of a transmit end and a receive end for downlink in an FDD environment is described. For instance, it is assumed that a transmit end 1300 is a base station, and a receive end 1302 is a terminal.

Referring to FIG. 13, in step 1310, the transmit 1300 transmits a CRS or a CSI-RS to the receive end 1302. In step 1312, the receive end 1302 acquires a transmultiplexer response matrix based on the CRS or CSI-RS received from the transmit end 1300, and determines an ICI based on the acquired transmultiplexer response matrix.

In step 1314, the receive end 1302 can select a codebook based on the ICI. For example, the receive end 1302 can compare a value of the ICI with at least one threshold value for codebook selection, and select one codebook among a sub-band codebook and a wide-band codebook in accordance with the comparison result. Thereafter, in step 1316, the receive end 1302 transmits a feedback signal to the transmit end 1300. Here, the feedback signal can include channel information, and a codebook index representing the selected codebook.

In step 1318, the transmit end 1300 designs a wide-band precoder based on the received feedback signal. For example, the transmit end 1300 can design a wide-band precoder for a corresponding subcarrier set, based on the channel information and the codebook index that are included in the feedback signal. Also, in step 1320, the receive end 1302 designs a receiver based on the channel information and the selected codebook. For example, the receive end 1302 can design a sub-band receiver of a matching filter form as in Equation 2 above, for the sake of the diagonalization of an effective channel response including a precoder, for a received signal inputted as a desired subcarrier.

In step 1322, the transmit end 1300 can use the wide-band precoder to transmit data to the receive end 1302, and the receive end 1302 can use the sub-band receiver to receive the data from the transmit end 1300.

Figure 14:
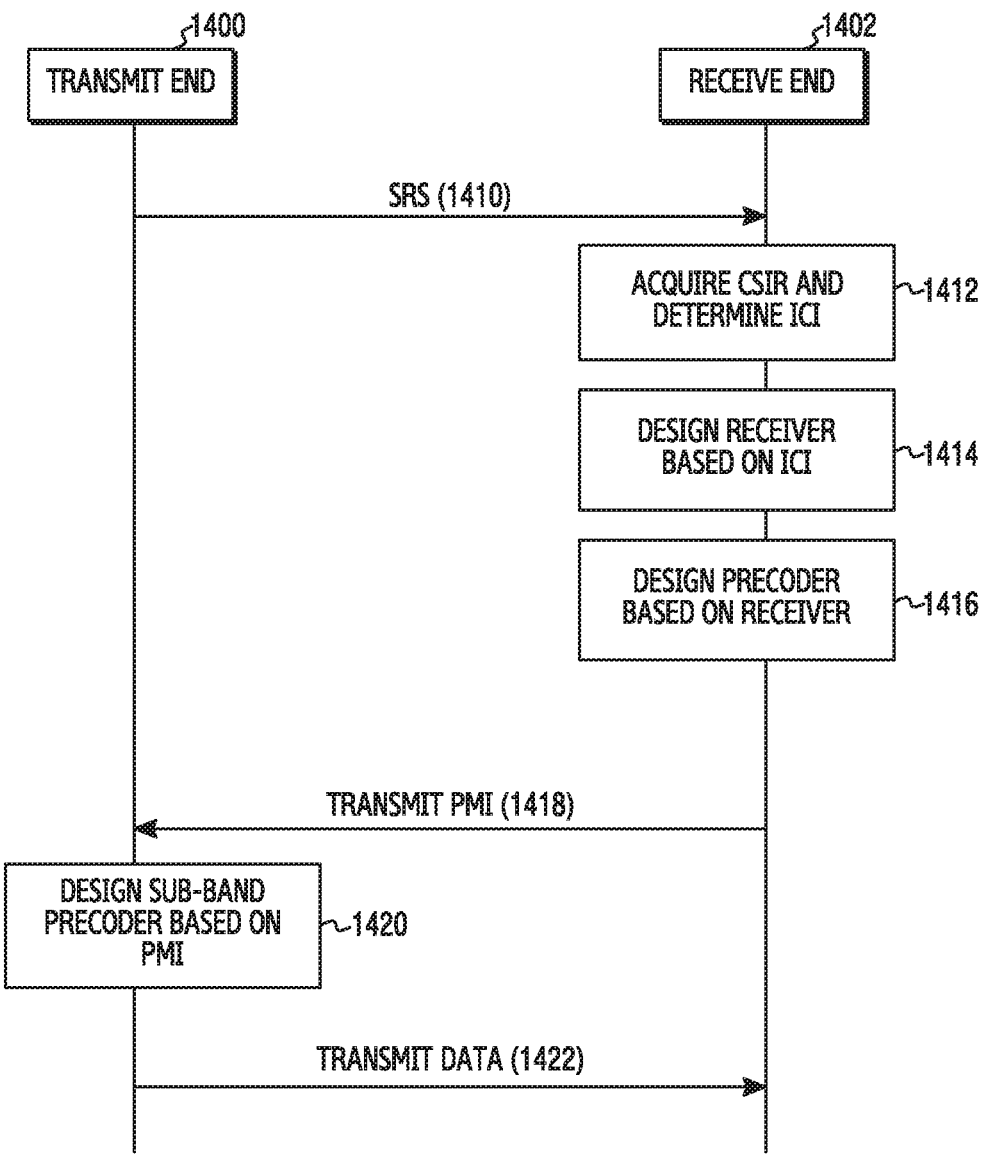
FIG. 14 illustrates a yet another example of a signaling and operation procedure of a transmit end and a receive end in case where channel state information is imperfect in a wireless communication system according to an exemplary embodiment of the present disclosure.

FIG. 14 illustrates a yet another example of a signaling and operation procedure of a transmit end and a receive end in case where channel state information is imperfect in a wireless communication system according to an exemplary embodiment of the present disclosure. Here, a signaling and operation procedure of a transmit end and a receive end for uplink is described. For instance, it is assumed that the transmit end 1400 is a terminal, and the receive end 1402 is a base station.

Referring to FIG. 14, in step 1410, the transmit 1400 transmits a Sounding Reference Signal (SRS) to the receive end 1402. In step 1412, the receive end 1402 acquires Channel State Information at Receiver (CSIR) based on the SRS received from the transmit end 1400, and determines an ICI.

In step 1414, the receive end 1402 designs a receiver based on the ICI. For example, as described in FIG. 8 above, the receive end 1402 determines a subcarrier region based on the ICI and, based on this, the receive end 1402 designs a wide-band receiver corresponding to a subcarrier set of the transmit end 1400.

Thereafter, in step 1416, the receive end 1402 designs a precoder based on the designed receiver. In step 1418, the receive end 1402 transmits a Precoding Matrix Indicator (PMI) corresponding to the designed precoder.

Thereafter, in step 1420, the transmit end 1400 designs a sub-band precoder based on the received PMI. For this, the receive end 1402 previously designs a codebook corresponding to sub-band precoding matrixes available in the transmit end 1400, and previously shares information on the designed codebook with the transmit end 1400. Accordingly, the transmit end 1400 can select a precoding matrix corresponding to the received PMI among the codebook that is previously shared with the receive end 1402, and use the selected precoding matrix to set the sub-band precoder.

In step 1422, the transmit end 1400 can use the sub-band precoder to transmit data to the receive end 1402, and the receive end 1402 can use the wide-band receiver corresponding to the subcarrier set that the transmit end 1400 uses, to receive the data from the transmit end 1400.

Figure 15:
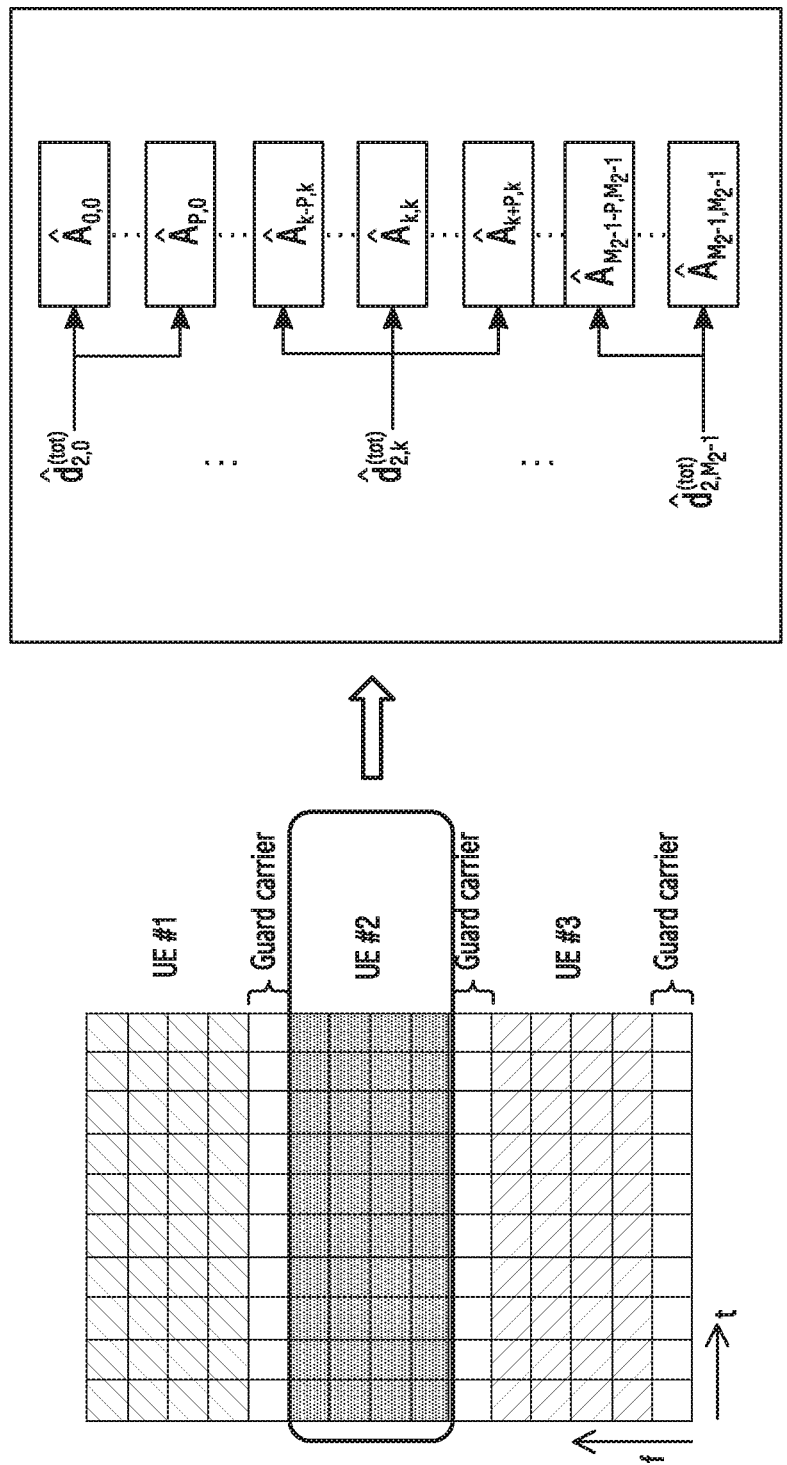
FIG. 15 illustrates a structure of a wide-band precoder for a user of a multi user environment in a wireless communication system according to an exemplary embodiment of the present disclosure.

FIG. 15 illustrates a structure of a wide-band precoder for a user of a multi user environment in a wireless communication system according to an exemplary embodiment of the present disclosure.

Referring to FIG. 15, it illustrates a subcarrier set that each user terminal uses in a multi user environment. At this time, a guard carrier exists between subcarrier sets of respective user terminals so as to prevent the occurrence of interference between the respective user terminals. Accordingly, an exemplary embodiment of the present disclosure can perform pre-processing for each user terminal in consideration of the guard carrier. For example, the right figure of FIG. 15 illustrates a wide-band precoder for a subcarrier set of a user terminal #2. As illustrated, in case where a subcarrier region for the wide-band precoder is 'P', when a $(k-P)^{th}$ subcarrier or a $(k+P)^{th}$ subcarrier is overlapped with a guard carrier for each subcarrier 'k', the wide-band precoder can be designed to exclude the corresponding subcarrier. In more detail, in case where the user terminal #2 uses subcarriers of 0 to $M_2-1$, the wide-band precoder of the user terminal #2 can be constructed to exclude a $(0-P)^{th}$ subcarrier and an $(M_2-1)^{th}$ subcarrier, because the $(0-P)^{th}$ subcarrier and the $(M_2-1)^{th}$ subcarrier are overlapped with guard subcarriers. That is, the wide-band precoder in the multi user environment can be constructed to include only a subcarrier set that a corresponding user terminal uses.

Figure 16:
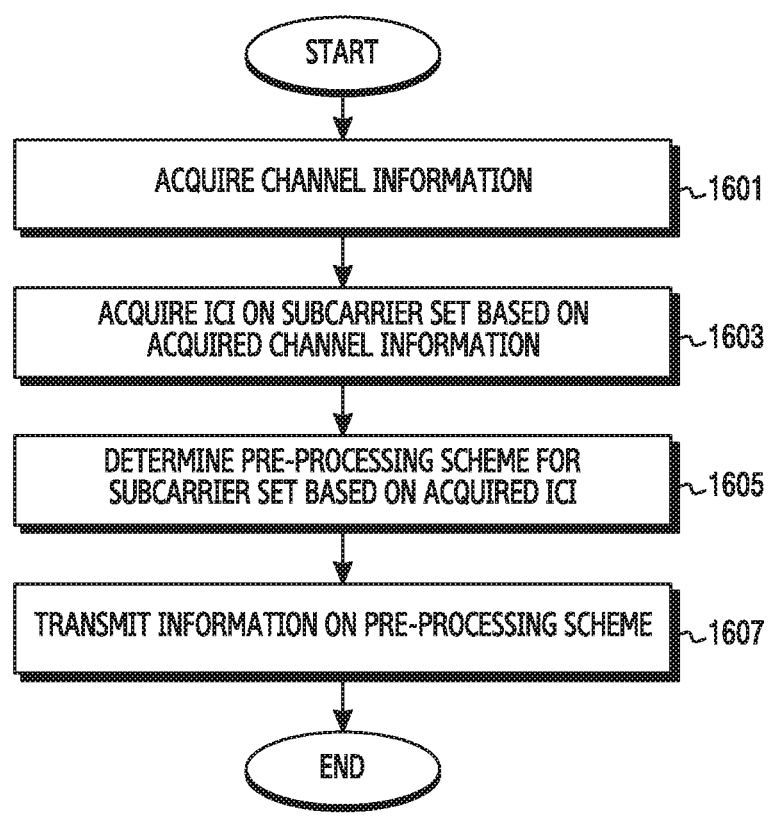
FIG. 16 illustrates an operation procedure of a communication node in a wireless communication system according to an exemplary embodiment of the present disclosure.

FIG. 16 illustrates an operation procedure of a communication node in a wireless communication system according to an exemplary embodiment of the present disclosure. Here, the communication node can be a transmit end or a receive end.

Referring to FIG. 16, in step 1601, the communication node acquires channel information. For example, the communication node can acquire channel information from an RS transmitted from a counterpart node, or acquire channel information by receiving a signal including the channel information from the counterpart node.

In step 1603, the communication node acquires an ICI on a subcarrier set, based on the acquired channel information. For example, the communication node can acquire a transmultiplexer response matrix based on the channel information, and acquire the ICI from the acquired transmultiplexer response matrix.

In step 1605, the communication node determines a pre-processing scheme for a subcarrier set, based on the acquired ICI. Here, the pre-processing scheme can include a sub-band pre-processing scheme, a wide-band pre-processing scheme, a sub-block pre-processing scheme, etc. For example, the communication node can compare a maximum value of an ICI sum and a threshold value and determine whether to use the sub-band pre-processing scheme or whether to use the wide-band pre-processing scheme. In more detail, if the maximum value of the ICI sum is less than or is equal to the threshold value, the communication node can determine the sub-band pre-processing scheme and, if the maximum value of the ICI sum is greater than the threshold value, the communication node can determine the wide-band pre-processing scheme. Additionally, if the wide-band pre-processing scheme is determined, the communication node can determine a subcarrier region. For example, the communication node can determine a subcarrier region determination metric as illustrated in FIG. 10A and FIG. 10B and then, based on the determined metric, the communication node can determine a subcarrier region based on a subcarrier region quantization table as illustrated in FIG. 9. Also, the communication node can determine a criterion for designing of a pre-processor, i.e., a precoder or a receiver. Also, the communication node can determine codebook related information (e.g., a codebook index or a precoding matrix index) for a counterpart node, based on the pre-processing scheme and the subcarrier region.

In step 1607, the communication node transmits information on the pre-processing scheme to the counterpart node. For example, the information on the pre-processing scheme can include information representing the sub-band pre-processing scheme or the wide-band pre-processing scheme, subcarrier information on the wide-band pre-processing scheme, criterion information for designing of a pre-processor, codebook related information, etc.

Thereafter, the communication node terminates the operation procedure of the communication node in the wireless communication system according to the exemplary embodiment of the present disclosure.

Figure 17:
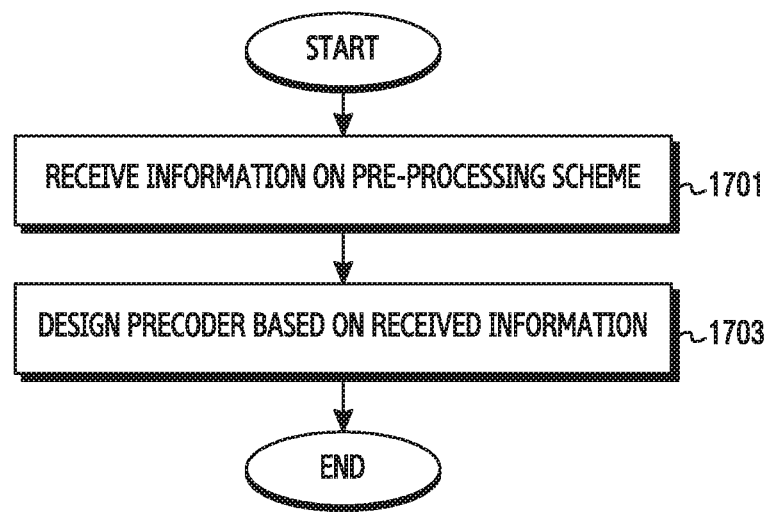
FIG. 17 illustrates an operation procedure of a communication node in a wireless communication system according to an exemplary embodiment of the present disclosure.

FIG. 17 illustrates an operation procedure of a communication node in a wireless communication system according to an exemplary embodiment of the present disclosure. Here, the communication node can be a transmit end or a receive end.

Referring to FIG. 17, in step 1701, the communication node receives information on a pre-processing scheme from a counterpart node. For example, the information on the pre-processing scheme can include information representing a sub-band pre-processing scheme or a wide-band pre-processing scheme, subcarrier information on the wide-band pre-processing scheme, criterion information for designing of a pre-processor, codebook related information, etc.

In step 1703, the communication node can design a pre-processor based on the received information. For example, the communication node can design a precoder or a receiver, based on the received information.

Thereafter, the communication node terminates the operation procedure of the communication node in the wireless communication system according to the exemplary embodiment of the present disclosure.

Figure 18:
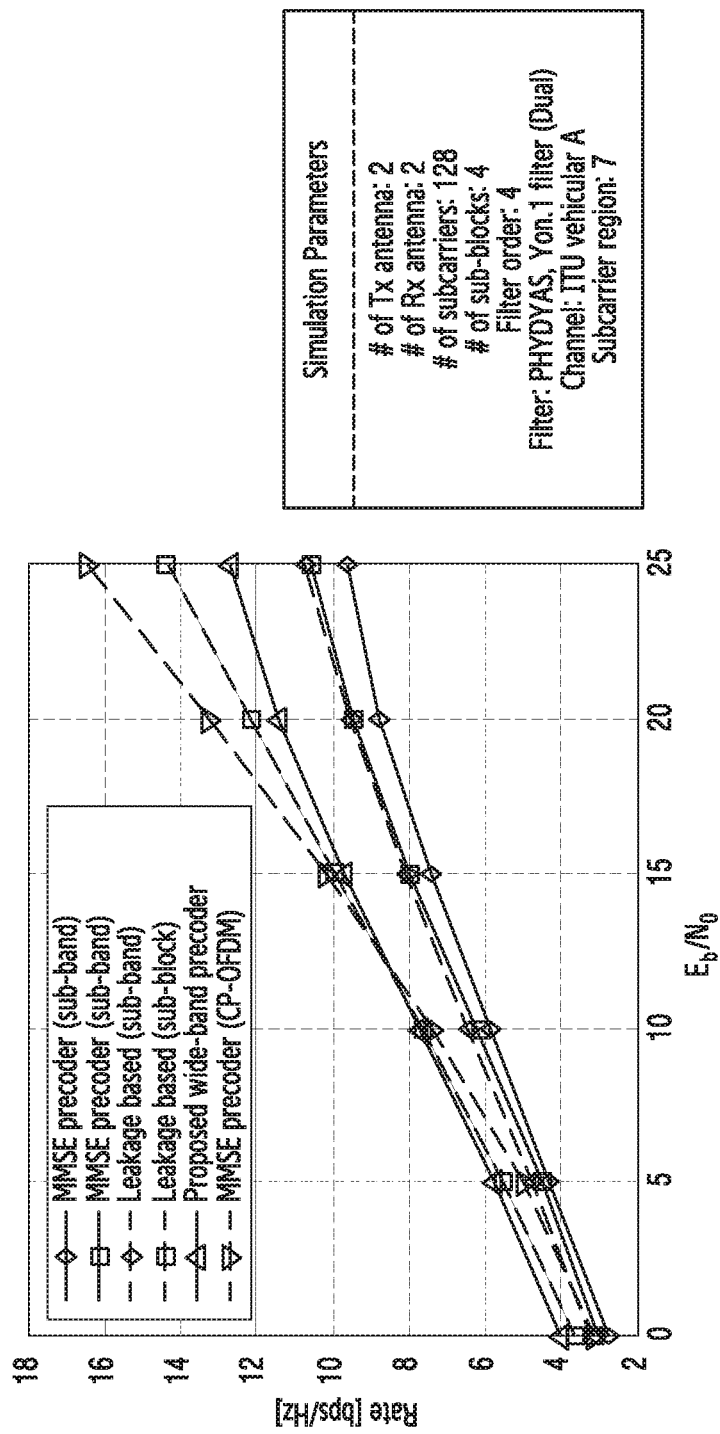
FIG. 18 illustrates a simulation result using a wide-band precoder in a wireless communication system according to an exemplary embodiment of the present disclosure.

FIG. 18 illustrates a simulation result using a wide-band precoder in a wireless communication system according to an exemplary embodiment of the present disclosure. FIG. 18 shows data rate performance when using a precoding scheme according to the conventional art and a wide-band precoding scheme according to an exemplary embodiment of the present disclosure.

As illustrated in FIG. 18, in an MMSE based precoding scheme according to the conventional art, performance deterioration occurs due to an increase of noise power of a matrix conversion process in a filter bank system of a low frequency confinement characteristic. In contrast, a wide-band precoding scheme according to the present disclosure can have an effect capable of getting similar performance with a data rate of a sub-block precoder, and furthermore decreasing a design complexity.

Figure 19:
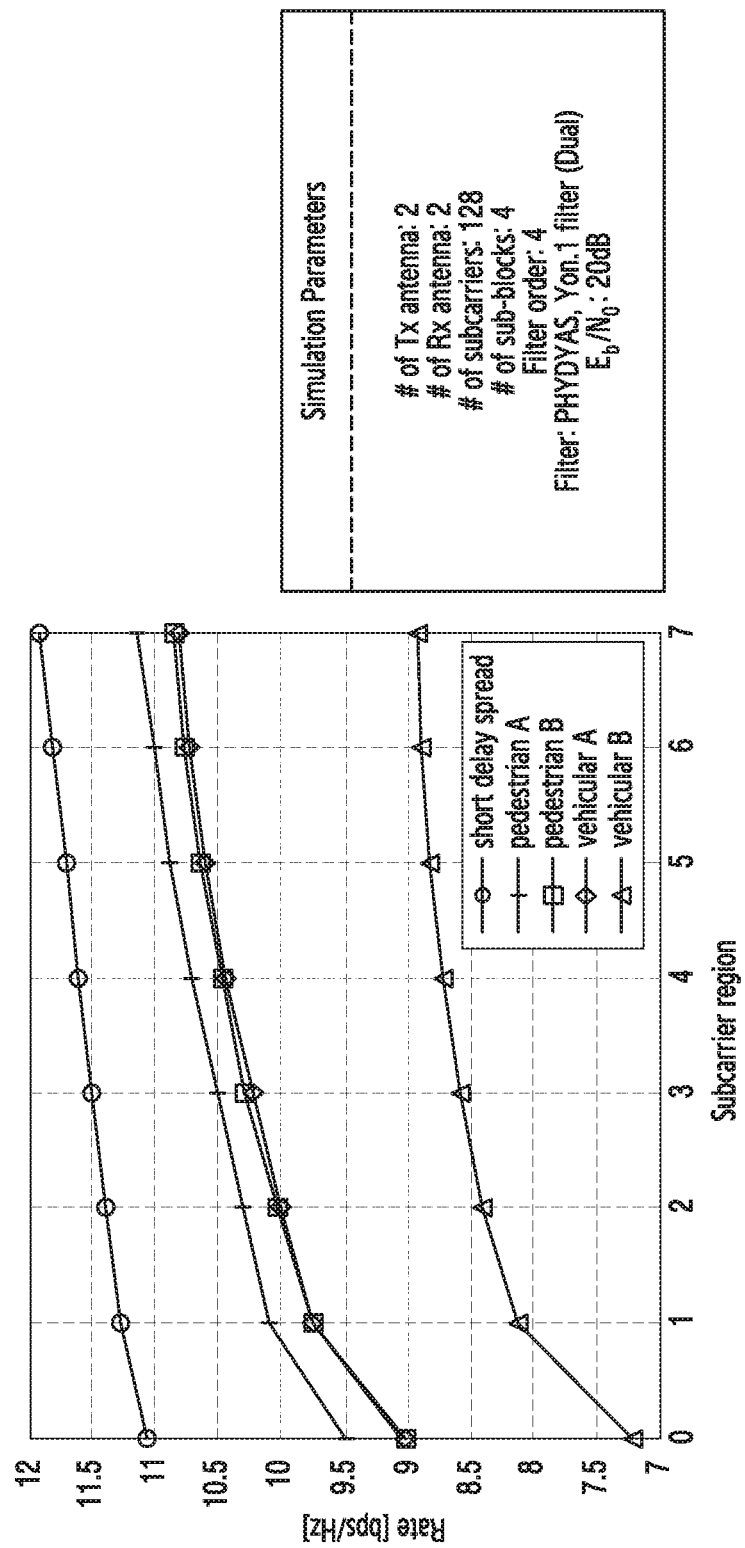
FIG. 19 illustrates a result of data rate performance dependent on an increase of a subcarrier region in a wireless communication system according to an exemplary embodiment of the present disclosure.

FIG. 19 illustrates a result of data rate performance dependent on an increase of a subcarrier region in a wireless communication system according to an exemplary embodiment of the present disclosure. FIG. 19 shows a data rate of a wide-band pre-processor dependent on an increase of a subcarrier region in each different frequency-selective environment.

Referring to FIG. 19, it can get a higher data rate as a subcarrier region increases, but an increase level of the data rate is gradually decreased according to the increase of the subcarrier region. Accordingly, as described in exemplary embodiments of the present disclosure, it is of significance to determine a suitable subcarrier region in accordance to a current channel and a feature of a filter. Through this subcarrier region determination, an exemplary embodiment of the present disclosure can get a sufficient data rate and concurrently, can prevent an unnecessary complexity increase.

Figure 20:
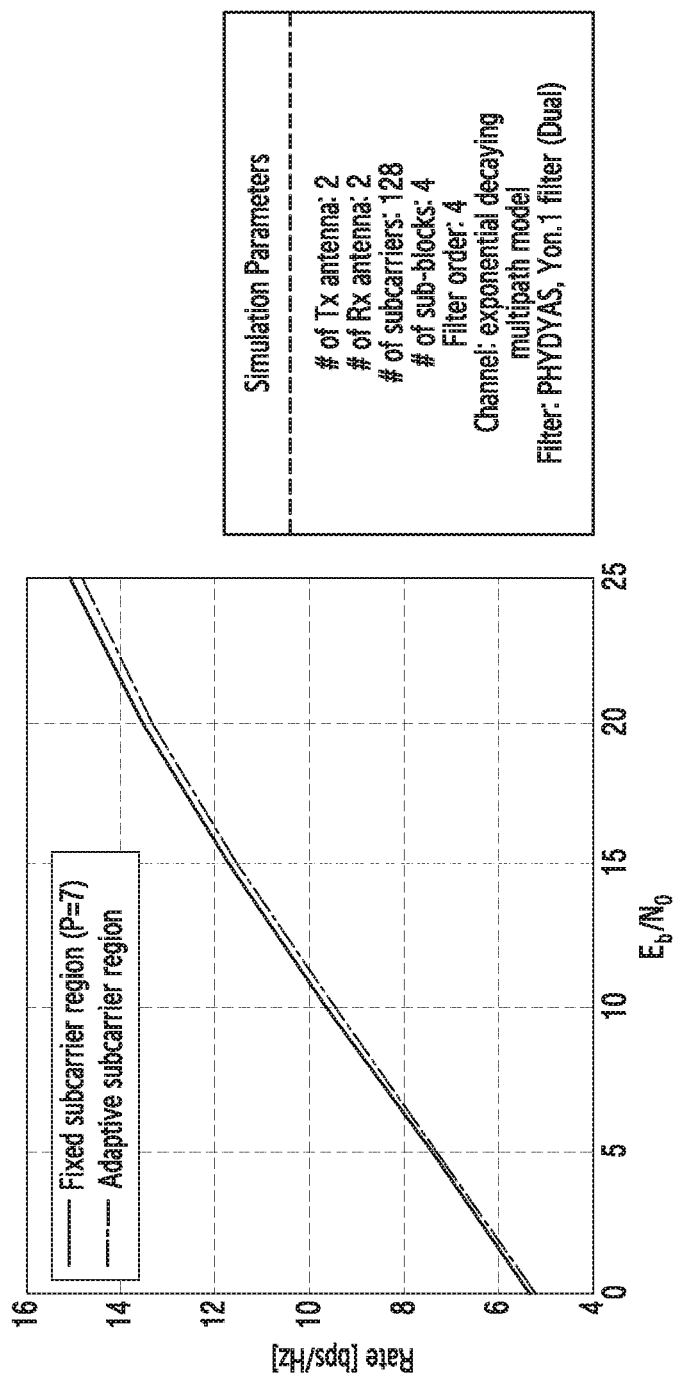
FIG. 20 illustrates a result of data rate performance when determining a subcarrier region according to a channel in a wireless communication system according to an exemplary embodiment of the present disclosure.

FIG. 20 illustrates a result of data rate performance when determining a subcarrier region according to a channel in a wireless communication system according to an exemplary embodiment of the present disclosure. FIG. 20 shows a data rate when using a subcarrier region changed adaptively according to a channel and when using a fixed subcarrier region.

As illustrated in FIG. 20, it can be appreciated that a data rate when using the same subcarrier region in a channel within a coherence time is nearly identical with a data rate when adaptively changing a subcarrier region, based on statistical information of the channel.

The present disclosure can acquire a similar performance with sub-block precoding and decrease a precoder design complexity, by applying a wide-band precoder for a subcarrier set that will be provided to a filter bank of a low frequency confinement characteristic in a wireless communication system supporting FBMC.

Methods according to exemplary embodiments mentioned in claims or specification of the present disclosure can be implemented in a form of hardware, software, or a combination of hardware and software.

This software can be stored in a computer-readable storage medium. The computer-readable storage medium stores at least one program including instructions of enabling an electronic device to execute a method of the present disclosure when being executed by at least one program (software module) and/or at least one processor in the electronic device.

This software can be stored in a volatile storage device, a non-volatile storage device such as a Read Only Memory (ROM), or a memory such as a Random Access Memory (RAM), a memory chip, a device or an integrated circuit, or an optical or magnetic readable medium such as a Compact Disc-ROM (CD-ROM), a Digital Versatile Disc (DVD), a magnetic disc, a magnetic tape, etc.

The storage device and storage medium are exemplary embodiments of programs including instructions of implementing one exemplary embodiment when executed, or a machine-readable storage means suitable for storing the programs. Exemplary embodiments provide a program including a code for implementing a device or method as claimed in any one of claims of the present specification, and a machine-readable storage medium storing such the program. Furthermore, such the programs can be electronically delivered by any medium such as a communication signal delivered through a wired or wireless connection, and exemplary embodiments suitably include an equivalent.

In the aforementioned concrete exemplary embodiments, constituent elements included in the disclosure have been expressed in the singular form or plural form in accordance to a proposed concrete exemplary embodiment. But, the expression of the singular form or plural form is selected suitable to a proposed situation for description convenience. The aforementioned exemplary embodiments are not limited to singular or plural constituent elements and, despite a constituent element expressed in the plural form, it can be constructed in the singular form, or despite a constituent element expressed in the singular form, it can be constructed in the plural form.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating in a communication node, the method comprising:
   determining an inter-carrier interference (ICI) on a subcarrier set based on a frequency confinement characteristic of at least one filter corresponding to the subcarrier set and a channel for the subcarrier set;
   determining a precoding scheme based on the ICI on the subcarrier set; and
   transmitting, to a counterpart node, a feedback signal comprising information indicating the precoding scheme,
   wherein the precoding scheme is determined to be a first scheme for using each subcarrier symbol in the subcarrier set to obtain a precoding result for the each subcarrier symbol in response to the ICI being less than a threshold value, and
   wherein the precoding scheme is determined to be a second scheme for using each subcarrier symbol in the subcarrier set and at least one additional subcarrier symbol to obtain a precoding result for the each subcarrier symbol in response to the ICI being greater than the threshold value.

2. The method of claim 1, wherein the determining of the precoding scheme comprises:
   if a maximum value of a sum of ICI components of the ICI is less than or is equal to the threshold value, determining the precoding scheme as a sub-band pre-processing scheme for precoding a single subcarrier; and
   if the maximum value of the sum of the ICI components of the ICI is greater than the threshold value, determining the precoding scheme as a wide-band pre-processing scheme for precoding a plurality of subcarriers,
   wherein the threshold value is set such that the maximum value of the sum of the ICI components guarantees an average value of a minimum signal to interference ratio (SIR) for all subcarriers.

3. The method of claim 2, wherein a number of the plurality of subcarriers corresponds to a subcarrier range, and
   wherein at least one of the plurality of subcarriers is adjacent to the subcarrier set.

4. The method of claim 3, wherein the determining of the precoding scheme comprises:
   determining a value of dividing the sum of the ICI components by a maximum value of a ICI component, as a subcarrier region determination metric; and
   determining the subcarrier range based on the subcarrier region determination metric.

5. The method of claim 3, wherein the feedback signal further comprises criterion information necessary for designing a pre-processor corresponding to the determined precoding scheme, codebook information, or precoding matrix index information.

6. The method of claim 3, further comprising setting a pre-processor of the communication node based on at least one of information regarding the subcarrier range, or criterion information necessary for designing the pre-processor corresponding to the determined precoding scheme.

7. The method of claim 6, wherein the setting of the pre-processor of the communication node comprises setting a precoder maximizing a signal to leakage and noise ratio (SLNR) based on at least one of information regarding the subcarrier range, and criterion information necessary for designing the pre-processor corresponding to the determined precoding scheme.

8. The method of claim 3, further comprising setting a receiver based on a precoding matrix comprising the subcarrier range and an effective channel response,
wherein the effective channel response is determined based on the frequency confinement characteristic of the at least one filter and the channel for the subcarrier set.

9. The method of claim 3, further comprising receiving a signal comprising at least one of information regarding the subcarrier range, criterion information necessary for designing a pre-processor corresponding to the determined precoding scheme, codebook information, or precoding matrix index information.

10. The method of claim 1, wherein the communication node is associated with a communication system which is based on a filter bank multi carrier (FBMC) scheme.

11. An apparatus of a communication node, the apparatus comprising:
at least one processor configured to:
determine an inter-carrier interference (ICI) on a subcarrier set based on a frequency confinement characteristic of at least one filter corresponding to the subcarrier set and a channel for the subcarrier set, and
determine a precoding scheme based on the ICI on the subcarrier set; and
at least one transceiver configured to transmit, to a counterpart node, a feedback signal comprising information indicating the precoding scheme,
wherein the precoding scheme is determined to be a first scheme for using each subcarrier symbol in the subcarrier set to obtain a precoding result for the each subcarrier symbol in response to the ICI being less than a threshold value, and
wherein the precoding scheme is determined to be a second scheme for using each subcarrier symbol in the subcarrier set and at least one additional subcarrier symbol to obtain a precoding result for the each subcarrier symbol in response to the ICI being greater than the threshold value.

12. The apparatus of claim 11, wherein the at least one processor is further configured to:
if a maximum value of a sum of ICI components of the ICI is less than or is equal to a threshold value, determine the precoding scheme as a sub-band pre-processing scheme for precoding a single subcarrier, and
if the maximum value of the sum of the ICI components of the ICI is greater than the threshold value, determine the precoding scheme as a wide-band pre-processing scheme for precoding a plurality of subcarriers,
wherein the threshold value is set such that the maximum value of the sum of the ICI components guarantees an average value of a minimum signal to interference ratio (SIR) for all subcarriers.

13. The apparatus of claim 12, wherein a number of the plurality of subcarriers corresponds to a subcarrier range, and
wherein at least one of the plurality of subcarriers is adjacent to the subcarrier set.

14. The apparatus of claim 13, wherein the at least one processor is further configured to:
determine a value of dividing the sum of the ICI components by a maximum value of a ICI component, as a subcarrier region determination metric, and
determine the subcarrier range based on the subcarrier region determination metric.

15. The apparatus of claim 13, wherein the feedback signal further comprises criterion information necessary for designing a pre-processor corresponding to the determined precoding scheme, codebook information, or precoding matrix index information.

16. The apparatus of claim 13, wherein the at least one processor is further configured to set a pre-processor of the communication node based on at least one of information regarding the subcarrier range, or criterion information necessary for designing the pre-processor corresponding to the determined precoding scheme.

17. The apparatus of claim 16, wherein the at least one processor is further configured to set a precoder maximizing a signal to leakage and noise ratio (SLNR) based on at least one of information regarding the subcarrier range, and criterion information necessary for designing the pre-processor corresponding to the determined precoding scheme.

18. The apparatus of claim 13, wherein:
the at least one processor is further configured to set a receiver based on a precoding matrix comprising the subcarrier range and an effective channel response, and
the effective channel response is determined based on the frequency confinement characteristic of the at least one filter and the channel for the subcarrier set.

19. The apparatus of claim 13, wherein the at least one transceiver is further configured to receive a signal comprising at least one of information regarding the subcarrier range, criterion information necessary for designing a pre-processor corresponding to the determined precoding scheme, codebook information, or precoding matrix index information.

20. The apparatus of claim 11, wherein the communication node is associated with a communication system which is based on a filter bank multi carrier (FBMC) scheme.

* * * * *